US012329278B2

(12) United States Patent
Dash et al.

(10) Patent No.: US 12,329,278 B2
(45) Date of Patent: *Jun. 17, 2025

(54) MULTI-FUNCTION TABLE

(71) Applicant: StoreBound LLC, New York, NY (US)

(72) Inventors: Evan Marc Dash, New York, NY (US); Yiyang Zhang, Shenzhen (CN); Defang Chen, Shenzhen (CN); Xiqing Zhong, Dongguan (CN); Yijun Wang, Dongguan (CN)

(73) Assignee: StoreBound LLC, New York, NY (US)

(*) Notice: Subject to any disclaimer, the term of this patent is extended or adjusted under 35 U.S.C. 154(b) by 0 days.

This patent is subject to a terminal disclaimer.

(21) Appl. No.: 18/500,270

(22) Filed: Nov. 2, 2023

(65) Prior Publication Data

US 2024/0057769 A1 Feb. 22, 2024

Related U.S. Application Data

(63) Continuation of application No. 18/071,828, filed on Nov. 30, 2022, now Pat. No. 11,832,723, which is a (Continued)

(51) Int. Cl.
*A47B 83/04* (2006.01)
*A47B 13/08* (2006.01)
(Continued)

(52) U.S. Cl.
CPC .............. *A47B 83/04* (2013.01); *A47B 13/08* (2013.01); *A47B 31/02* (2013.01); (Continued)

(58) Field of Classification Search
CPC ....... A47B 13/08; A47B 83/04; A47B 88/919; A47B 2083/003; A47B 2210/175; A47B 2220/0091; A47B 31/02; F25D 23/12
(Continued)

(56) References Cited

U.S. PATENT DOCUMENTS 1,351,097 A 8/1920 Cook
1,492,428 A 4/1924 Cook
(Continued)

FOREIGN PATENT DOCUMENTS

CN 205988122 U * 3/2017

OTHER PUBLICATIONS

Machine Translation of CN-205988122-U (Year: 2017).*
(Continued)

*Primary Examiner* — Daniel J Troy
*Assistant Examiner* — Timothy M Ayres
(74) *Attorney, Agent, or Firm* — BELLES KATZ LLC

(57) ABSTRACT

A furniture unit in the form of a multi-function table including a base having front end, a rear end, and a primary cavity. A first storage unit is located within the primary cavity to define a first storage area having a first opening at the front end of the base that is closed by a first closure member. A second storage unit is located within the primary cavity to define a second storage area having a second opening at the front end of the base that is closed by a second closure member. The primary cavity may have a rear portion located between the first and second storage units and the rear end of the base. A compressor may be located within the rear portion of the primary cavity and may be operably coupled to the first storage area to cool the first storage area.

20 Claims, 20 Drawing Sheets

Related U.S. Application Data continuation of application No. 16/664,080, filed on Oct. 25, 2019, now Pat. No. 11,533,994, which is a continuation of application No. 15/951,852, filed on Apr. 12, 2018, now Pat. No. 10,485,341.

(60) Provisional application No. 62/484,633, filed on Apr. 12, 2017.

(51) Int. Cl.

| | |
|---|---|
| ***A47B 31/02*** | (2006.01) |
| *A47B 83/00* | (2006.01) |
| *A47B 88/919* | (2017.01) |
| *F21V 33/00* | (2006.01) |
| *F21Y 115/10* | (2016.01) |

(52) U.S. Cl.

CPC ....... *A47B 2083/003* (2013.01); *A47B 88/919* (2017.01); *A47B 2210/175* (2013.01); *A47B 2220/0091* (2013.01); *F21V 33/0012* (2013.01); *F21Y 2115/10* (2016.08)

(58) Field of Classification Search

USPC ........................................ 312/237, 402, 406

See application file for complete search history.

(56) References Cited

U.S. PATENT DOCUMENTS

| | | | | |
|---|---|---|---|---|
| 3,292,931 | A | 12/1966 | Grunwald | |
| 3,572,873 | A | 3/1971 | Harting, Jr. | |
| 3,732,702 | A | 5/1973 | Desch | |
| D233,292 | S | 10/1974 | Rosen | |
| D237,415 | S | 10/1975 | Davis | |
| D267,532 | S | 1/1983 | Platner | |
| 4,378,137 | A * | 3/1983 | Gibson | A47B 47/03 312/265.3 |
| 4,571,740 | A | 2/1986 | Kirby et al. | |
| 4,581,902 | A | 4/1986 | Starck et al. | |
| 4,939,912 | A | 7/1990 | Leonovich, Jr. | |
| 5,235,822 | A | 8/1993 | Leonovich, Jr. | |
| 5,415,010 | A | 5/1995 | Woo | |
| D364,064 | S | 11/1995 | Lorenz | |
| D440,074 | S | 4/2001 | Hutton | |
| 6,484,512 | B1 | 11/2002 | Anderson et al. | |
| 6,564,570 | B2 | 5/2003 | Koike et al. | |
| 6,715,299 | B2 | 4/2004 | Kim et al. | |
| 6,715,302 | B2 * | 4/2004 | Ferragut | F25D 29/00 236/94 |
| 6,769,260 | B2 | 8/2004 | Lee et al. | |
| D533,731 | S | 12/2006 | Boerner et al. | |
| D553,385 | S | 10/2007 | Soressi | |
| D569,127 | S | 5/2008 | Kanthasamy | |
| 7,418,747 | B1 | 9/2008 | Myers | |
| 7,519,195 | B2 | 4/2009 | Hesketh | |
| 7,744,252 | B2 | 6/2010 | Maxik | |
| D622,976 | S | 9/2010 | Lovegrove | |
| 8,038,235 | B2 | 10/2011 | Lowery et al. | |
| D669,704 | S | 10/2012 | Zambelli | |
| D674,067 | S | 1/2013 | Ching | |
| 8,506,023 | B2 | 8/2013 | Goldie | |
| 8,517,478 | B2 | 8/2013 | Diemel et al. | |
| D701,404 | S | 3/2014 | Thompson | |
| 8,696,075 | B1 | 4/2014 | Rios | |
| D728,975 | S | 5/2015 | Park et al. | |
| 9,124,308 | B2 | 9/2015 | Metcalf | |
| D752,905 | S | 4/2016 | Healy | |
| D772,588 | S | 11/2016 | Kim | |
| D781,620 | S | 3/2017 | Curthelet et al. | |
| 9,635,771 | B2 | 4/2017 | Head | |
| D785,983 | S | 5/2017 | Denby et al. | |
| D787,238 | S | 5/2017 | Miller et al. | |
| D788,186 | S | 5/2017 | Lee | |
| 9,722,449 | B2 | 8/2017 | Jung | |
| D799,860 | S | 10/2017 | Schmitt | |
| D813,573 | S | 3/2018 | Hannoosh et al. | |
| D815,465 | S | 4/2018 | Hannoosh et al. | |
| D817,366 | S | 5/2018 | Kim et al. | |
| 9,970,651 | B2 | 5/2018 | Wang et al. | |
| 10,037,673 | B1 | 7/2018 | Gray et al. | |
| 10,084,337 | B1 | 9/2018 | Cozzi | |
| 10,212,519 | B2 | 2/2019 | Nelson et al. | |
| 10,345,037 | B2 * | 7/2019 | Kim | F25D 23/12 |
| 10,371,439 | B2 * | 8/2019 | Marutani | G08B 21/22 |
| 10,485,341 | B2 | 11/2019 | Dash et al. | |
| 10,730,177 | B2 | 8/2020 | Liu | |
| 11,533,994 | B2 | 12/2022 | Dash et al. | |
| 2001/0010516 | A1 * | 8/2001 | Roh | F25D 29/00 455/66.1 |
| 2008/0169734 | A1 | 7/2008 | Bartels | |
| 2008/0203868 | A1 | 8/2008 | Leclear et al. | |
| 2009/0058245 | A1 | 3/2009 | He | |
| 2012/0091797 | A1 | 4/2012 | Kesler et al. | |
| 2013/0327064 | A1 | 12/2013 | Stein | |
| 2015/0320203 | A1 | 11/2015 | Mandon et al. | |
| 2016/0049034 | A1 | 2/2016 | Stradiota | |
| 2017/0258223 | A1 | 9/2017 | Stampler | |
| 2018/0014097 | A1 | 1/2018 | Lin | |
| 2018/0191178 | A1 | 7/2018 | Byrne et al. | |
| 2018/0295986 | A1 | 10/2018 | Dash et al. | |

OTHER PUBLICATIONS

Website: https://www.centralrestaurant.com/Kratos-Refrigeration-69K-733-Two-Door-Undercounter-Refrigerator-48-in-W-c178p506181.html?st-t=google_shopping_69K-733&gclid=CjwKCAjw8_nXBRAiEiwAXWe2ySLF-mSJ9ZgvFyOAf9JspYDwYeFY_8FR6QNw8tEBdkowBZLSaTOKvxoCK_QQAvD_BwE. Printed May 21, 2018.

Website: https://designbuzz.com/thunder-table-a-mighty-speaker-masked-as-a-coffee-table. Printed May 21, 2018.

Website: http://www.medicalexpo.com/prod/doimo-mis/product-79062-615589.html. Printed May 21, 2018.

Website: https//www.overstock.com/Home-Garden/Furniture-of-America-Knox-Espresso-Wood-Storage-Box-Coffee-Table/6237346/product.html. Printed May 21, 2018.

Website: https://www.smartables.eu/. Printed May 21, 2018.

Website: https://www.amazon.com/PRIMST-Multifunction-Refrigerator-Bluetooth-Speakers/dp/B01HZWZRE4, Printed Nov. 16, 2022.

* cited by examiner

MULTI-FUNCTION TABLE

CROSS-REFERENCE TO RELATED APPLICATIONS

The present application is a continuation of U.S. patent application Ser. No. 18/071,828, filed Nov. 30, 2022, which is a continuation of U.S. patent application Ser. No. 16/664,080, filed Oct. 25, 2019, now U.S. Pat. No. 11,533,994 which is a continuation of U.S. patent Ser. No. 15/951,852, filed Apr. 12, 2018, now U.S. Pat. No. 10,485,341, which claims the benefit of priority to U.S. Provisional Patent Application Ser. No. 62/484,633 filed Apr. 12, 2017, the entireties of which are incorporated herein by reference.

FIELD OF INVENTION

The present invention generally relates to tables, and more particularly relates to tables having multiple functions including but not limited to coffee and side tables.

BACKGROUND

Tables such as coffee tables are an integral part of most living areas in residential houses. Such tables are often located near a couch or chair to provide a place to set drinks, food, magazines, television remote controls, and other things that people sitting on the couch desire to have in close proximity for easy use.

Things that people in a living area often desire are refrigerated beverages or food items. Such items are usually stored in a refrigerator in a kitchen, garage, or other room remote from the living area. This requires people using the living area to get up and go to the area in which the refrigerator is located to retrieve the refrigerated beverages or food items.

BRIEF SUMMARY

The present invention provides a solution to the above described problem by providing a multifunction table. While the invention is initially described with regard to a coffee table, the invention can also be embodied in other tables such as a side table which can function as night stand in some implementation as further disclosed herein.

Embodiments of the invention solve the problem of having to get up and retrieve refrigerated and/or frozen items from a different room by providing a refrigerator and/or freezer in a table such as a coffee table. For simplicity, the term "refrigerator" will be understood to include devices that cool to a temperature below room temperature but above freezing, freeze or both. By incorporating a refrigerator into the table, people in the living area where the table is located can retrieve a refrigerated beverage or food item without having to leave the living area or, in some cases, even get up from their seat.

By providing a drawer that moves in and out of the refrigerated space, access is provided to a user of a seating area at a convenient location and orientation. This is contrary to normal small sized refrigerators which have a pivoting door instead of a drawer. Due to the spacing that often exists between a coffee table and a couch, for example, a drawer provides better access and easier opening than does a pivoting door.

Most refrigerators require an electrically-driven refrigerating system that generates heat outside of the refrigerated space. This heat must be removed from portions of the refrigerating system, such as a compressor, in order for the refrigerating system to work. Embodiments of the invention include audio speakers integrated in the table. The audio speakers can have air ports that permit movement of air between the back side of speaker drivers and the environment outside of the speakers. In some embodiments, these air ports open into an area inside the table that includes the compressor and/or other heat generating portions of the refrigerating system. The air moved by the speakers through the air ports can, in turn, move the air directly adjacent to the heat generating portions to create air circulation around the heat generating portions. This air circulation can remove heat from the heat generating portions to help cool them.

Each of the multifunction tables described herein may further be a "smart" table comprising various electronics and ports configured for providing audio, lighting, electronic device charging (e.g. cell phones), and other functions/features as described herein.

In one aspect, a multifunction table includes a base comprising a front end, a rear end, and a primary cavity; a first storage unit located within the primary cavity, the first storage unit defining a first storage area having a first opening at the front end of the base that is closed by a first closure member; a second storage unit located within the primary cavity, the second storage unit defining a second storage area having a second opening at the front end of the base that is closed by a second closure member, the second storage area being adjacent to the first storage area; the primary cavity comprising a rear portion located between the first and second storage units and the rear end of the base; and a compressor located within the rear portion of the primary cavity and being operably coupled to the first storage area of the first storage unit to cool the first storage area.

In another aspect, a multifunction table includes a base comprising a primary cavity that is divided into a first storage portion having a first opening and a second storage portion having a second opening; a first storage unit comprising a first drawer and a first tub, the first storage unit being slidable relative to the base between: (1) a closed position wherein the first tub is located within the first storage portion of the primary cavity and a closure member of the first drawer closes the first opening of the first storage portion; and (2) an open position wherein the first tub is at least partially removed from the first storage portion; a second storage unit comprising a second drawer and a second tub, the second storage unit being slidable relative to the base between: (1) a closed position wherein the second tub is located within the second storage portion of the primary cavity and a second closure member of the second drawer closes the second opening of the second storage portion; and (2) an open position wherein the second tub is at least partially removed from the second storage portion; the primary cavity comprising a rear portion located between the first and second storage portions and a rear of the base; and a compressor located within the rear portion of the primary cavity and being operably coupled to the first storage area to cool the first storage area.

In some embodiments, the table has a rectangular parallelepiped or cuboid configuration having a length, a height, and a width. In some embodiments, the height is smaller than the length, and the height is smaller than the width.

In some embodiments, the non-refrigerated storage assembly has a plurality of drawers.

Some embodiments include a first audio speaker and a second audio speaker. In some embodiments, the first audio speaker projects sound out of a first side surface of the table, and the second audio speaker projects sound out of a second side surface of the table, and the first side surface and the second side surface are opposite sides of the table.

Some embodiments include a rear panel attached to the base, an upper panel attached to the base, and a bottom panel attached to the base.

Some embodiments include an air space within the base, the air space being located between the rear panel and the refrigeration section. In some embodiments, each of the first and second audio speakers has a driver and a port, the port fluidly connecting a rear side of the driver and the air space.

In some embodiments, the refrigeration assembly includes a compressor located in the air space, and the air space is a compressor chamber.

In some embodiments, when the driver is operating, the driver moves air in and out of the port such that air is moved around the compressor.

In some embodiments, a gap is provided between the rear panel and upper panel, the gap allowing air to pass from the air space to the environment outside the table. In some embodiments, the gap is a uniform gap around the rear panel. Some embodiments include ventilation openings in the bottom panel, the ventilation openings being fluidly connected to the air space.

Some embodiments include a control panel that controls functions of the refrigeration assembly. In some embodiments, the control panel further comprises controls that control functions of the first and second audio speakers.

Some embodiments include an electrical receptacle for providing electrical power to a device external to the table.

Some embodiments include a USB port for connecting an external music source to the first and second audio speakers.

Further areas of applicability of the present invention will become apparent from the detailed description provided hereinafter. It should be understood that the detailed description and specific examples, while indicating particular embodiment of the invention, are intended for purposes of illustration only and are not intended to limit the scope of the invention.

BRIEF DESCRIPTION OF THE DRAWINGS

The present invention will become more fully understood from the detailed description and the accompanying drawings, wherein.

DETAILED DESCRIPTION

Figure 1:
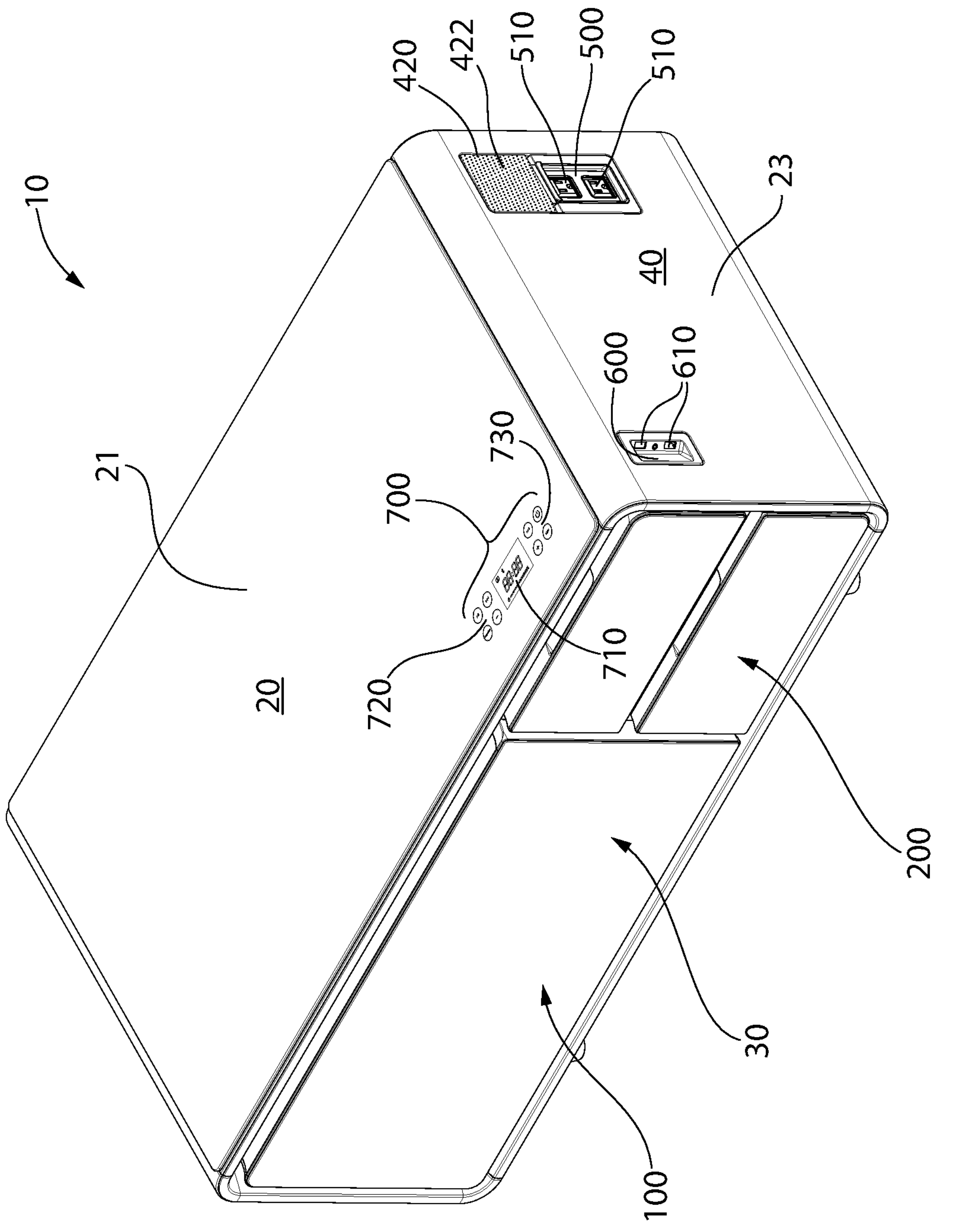
FIG. 1 is a front perspective view of an embodiment of a multi-function table according to the present disclosure.

The following description of embodiments is merely exemplary in nature and is in no way intended to limit the invention, its application, or uses.

With reference to the drawings, hereinafter, description will be given of tables according to embodiments based on the present invention. While the invention is exemplified herein as a coffee table, it is to be understood that the inventive concepts discussed herein can be applied other tables, including without limitation, end tables, lamp tables, sofa tables, and any other type of table. As a result, while a coffee table is used to describe the invention, it is noted that the table can be any of the alternate devices listed above, or any other table.

The description of illustrative embodiments according to principles of the present invention is intended to be read in connection with the accompanying drawings, which are to be considered part of the entire written description. In each of the following embodiments, if mention is made of counts, quantities and the like, the scope of the present invention is not necessarily limited to the counts, quantities and the like unless otherwise specified. In the respective embodiments to be described below, the same components and corresponding components are denoted with the same reference characters, and therefore the duplicative description is not repeated in some instances.

As used throughout, ranges are used as shorthand for describing each and every value that is within the range. Any value within the range can be selected as the terminus of the range. In addition, all references cited herein are hereby incorporated by reference in their entireties. In the event of a conflict in a definition in the present disclosure and that of a cited reference, the present disclosure controls.

In the description of embodiments disclosed herein, any reference to direction or orientation is merely intended for convenience of description and is not intended in any way to limit the scope of the present invention. Relative terms such as "lower," "upper," "horizontal," "vertical,", "above," "below," "up," "down," "top" and "bottom" as well as derivative thereof (e.g., "horizontally," "downwardly," "upwardly," etc.) should be construed to refer to the orientation as then described or as shown in the drawing under discussion. These relative terms are for convenience of description only and do not require that the apparatus be constructed or operated in a particular orientation. Terms such as "attached," "coupled," "connected," "interconnected," and the like refer to a relationship wherein structures are secured or attached to one another either directly or indirectly through intervening structures, as well as both movable or rigid attachments or relationships, unless expressly described otherwise.

Moreover, the features and benefits of the invention are illustrated by reference to the exemplified embodiments. Accordingly, the invention expressly should not be limited to such exemplary embodiments illustrating some possible non-limiting combination of features that may exist alone or in other combinations of features.

Figure 2:
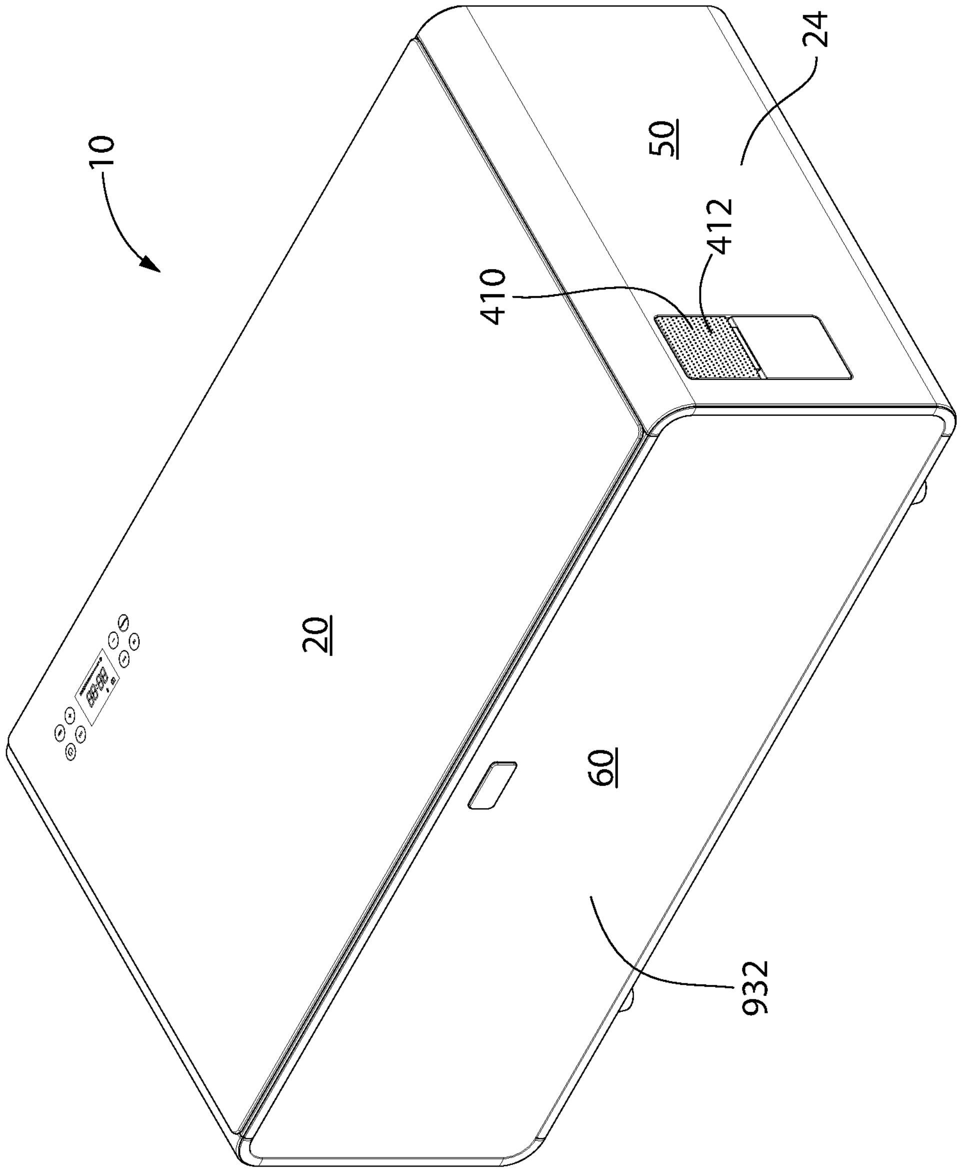
FIG. 2 is a rear perspective view of the table shown in FIG. 1.
Figure 3:
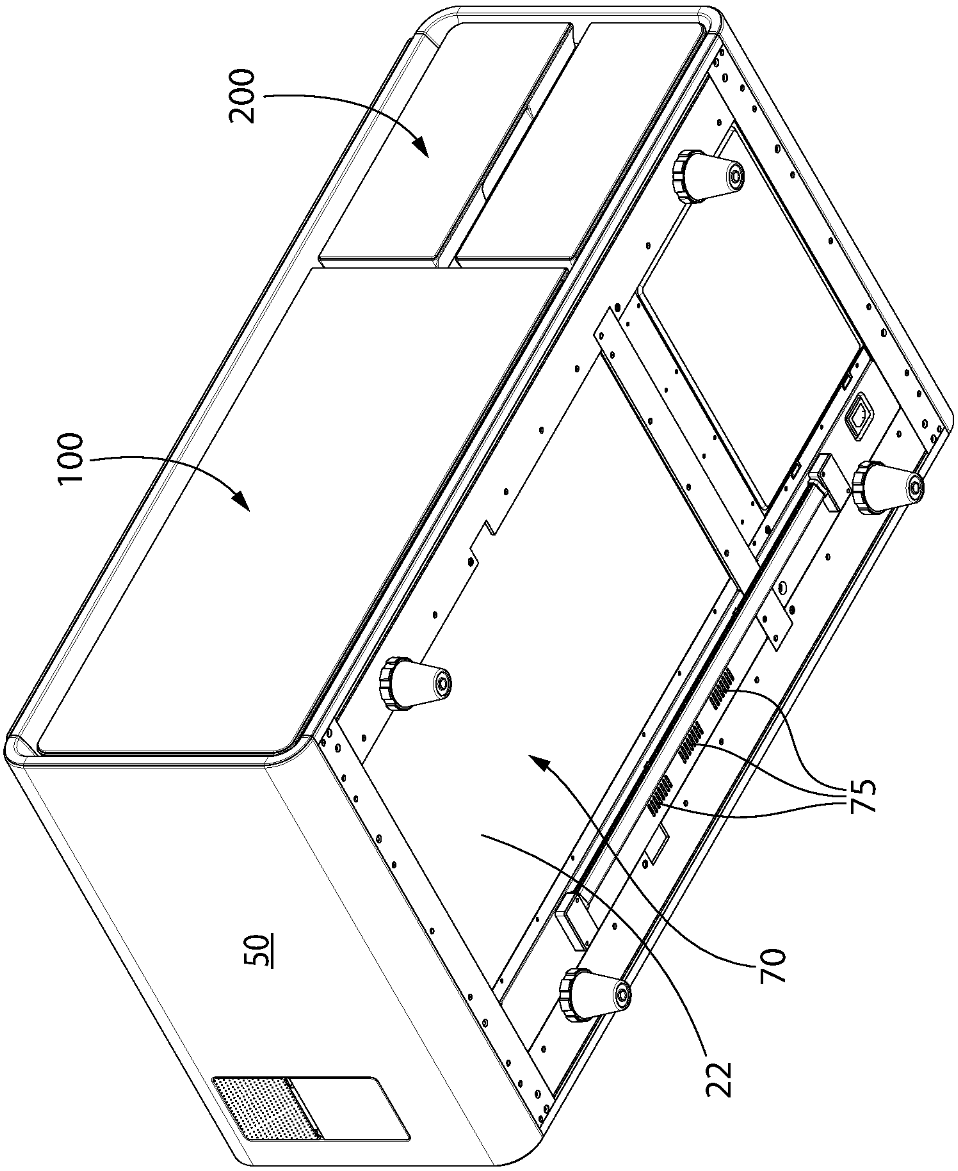
FIG. 3 is a bottom perspective view of the table shown in FIG. 1.

FIGS. 1-3 illustrate an example of a furniture unit such as a table 10 having a primary housing or base comprising a plurality of panels including top panel 21, bottom panel 22, right side panel 23, left side panel 24, and removable rear panel 932 which define a forwardly open primary cavity 12. The panels define a top 13 including a horizontal top or upper surface 20, a front side 30, a right side 40, a left side 50, a rear side 60 and a bottom 70. The front side 30, right side 40, left side 50, rear side 60 and bottom 70 can be considered to collectively define a base which supports the top surface 20. Table 10 has a rectangular parallelepiped or cuboid configuration in one non-limiting embodiment. This example is a table with a horizontal rectangular upper surface, a horizontal rectangular bottom, and vertical rectangular front, back and sides. Adjoining corner regions between these may be rounded in one embodiment as shown for esthetics and practical purposes to avoid sharp edge for users. Other embodiments of the invention, however, can have a different number of sides, use shapes other than rectangles, and use angles other than 90°. In this example, upper surface 20 is flat and covers substantially all of the entirety of the table from side to side and front to rear.

Table 10 may be shaped and configured to function as a coffee table. Accordingly, in one embodiment table 10 may have a length (measured between right side 40 and left side 50) which is at least two-times the height of the table (measured from the top to bottom of front side 30—excluding the legs 370).

This example of table 10 has a refrigeration unit or assembly 100 and a non-refrigerated storage unit or assembly 200 with openings located on and accessible from the front side 30. In this example, refrigeration assembly 100 is accessed by a single drawer (discussed below) and storage assembly 200 includes two drawers (discussed below). Other embodiments have different numbers of drawers and/or pivoting doors instead of drawers, or a combination of the two. Refrigeration assembly 100 may be configured as a thermoelectric refrigeration unit in one embodiment.

FIG. 2 shows a removable rear panel 932 covering rear side 60 of table 10. Rear panel 932 may be solid in one embodiment as shown, which is advantageous for coffee table 10 which is viewed from all sides. This rear panel can be removable to provide access to the rear sides of refrigeration assembly 100, storage assembly 200, speaker housings 410, 420, and/or other components of table 10. Rear side 60 can also include ventilation openings to provide ventilation air to the area behind refrigeration assembly 100 and speaker housings 410, 420. In other embodiments, rear side 60 is covered with a mesh or perforated panel to provide ventilation. FIG. 3 shows bottom 70 having a plurality of panels making up the bottom of table 10. In other embodiments, a single panel covers the entirety of the bottom of table 10. FIG. 3 shows three ventilation openings 75 that permit air to flow into the space behind refrigeration assembly 100 and storage assembly 200. More or fewer than three openings can alternatively be provided or an entire panel in the bottom side 70 can be a perforated panel.

Upper surface 20 includes control section 700 that controls various functions of the table. In this example, control section 700 includes a display 710, refrigerator controls 720, and sound controls 730 for audio speakers that are either part of, or separate from, table 10. Display 710 can show various information depending upon what controls are being used. For example, display 710 can show a refrigerator temperature, or other information pertaining to the refrigerator, when refrigerator controls 720 are being used. Display 710 can show sound information such as, for example, on or off, source, volume, balance, trouble, bass, etc., when sound controls 730 are being used. Control section 700 can also provide controls for other devices either integral to table 10 or external to table 10. For example, control section 700 can control an infrared, radio frequency, or other transmitter in table 10 that sends signals to lighting dimmers, window blinds, televisions, audio system components, door locks, or any other device that can be controlled. The control section 700 may thus be operably coupled to a programmable logic circuit (PLC) or controller in the table, which may be similar to the controller defined by programmable microprocessor 2000 further described elsewhere herein. Details of the microprocessor 2000 and related devices of the PLC will not be repeated here for the sake of brevity.

Table 10 also includes an input/charging station 600 that, in this case, includes USB ports 610 and other input and/or charging connections. Charging station 600 may be disposed on one of the right or left side panels 23 or 24; however, other locations may be used. USB ports 610 can be simple charging ports for devices such as phones, tablets, computers, and other electrical devices, or can be input connections for attaching a source of music or other audio to table 10, or a combination of both. Other input and/or charging connections that can be provided include, without limitation, HDMI, mini USB, micro USB, various smart phone connectors, optical connectors, RCA connectors, 3.5 mm audio connectors, or any other input or charging connection. In some embodiments, an output connector can also be included to pass an audio signal from the table to an external device such as, for example, headphones, external speakers, a storage device, or an external sound system.

Also shown in FIG. 1 is a main power receptacle 500 having two outlets 510. Main power receptacle 500 can be used to power external devices such as, for example, a hot plate, a toaster oven, a microwave oven, a fondue pot, a crockpot, a charger, lamp, or any other device that is powered by main power.

While a certain number of input and/or charging ports, outlets, and connections are shown, it is noted that any number of any type of connection can be included.

Table 10, in this example, has two audio speaker housings 410, 420 located at the rear upper corners of sides 40,50, respectively which contain speakers (e.g. drivers). FIG. 1 shows speaker housing 420 having a grille 422 that covers the speaker driver (not shown). FIG. 1 similarly shows speaker housing 410 covered by grille 412. Grilles 412, 422 may comprise perforated metal or plastic sheet material, fabricate covers, or other. Speaker housings 410, 420 can have their own integral amplifiers built into the speaker enclosures, or their drivers can be powered by amplifiers located outside of the speaker enclosures, but inside table 10. Alternatively, the drivers of speaker housings 410, 420 can be powered by amplifiers located outside of table 10. In any of these configurations, table 10 can include connections to connect either internal or external amplifiers to speaker housings 410, 420. For example, table 10 can include connections to plug external amplifiers to speaker housings 410, 420 in order to supply more power to speaker housings 410, 420 than can be provided by integral amplifiers.

Figure 4:
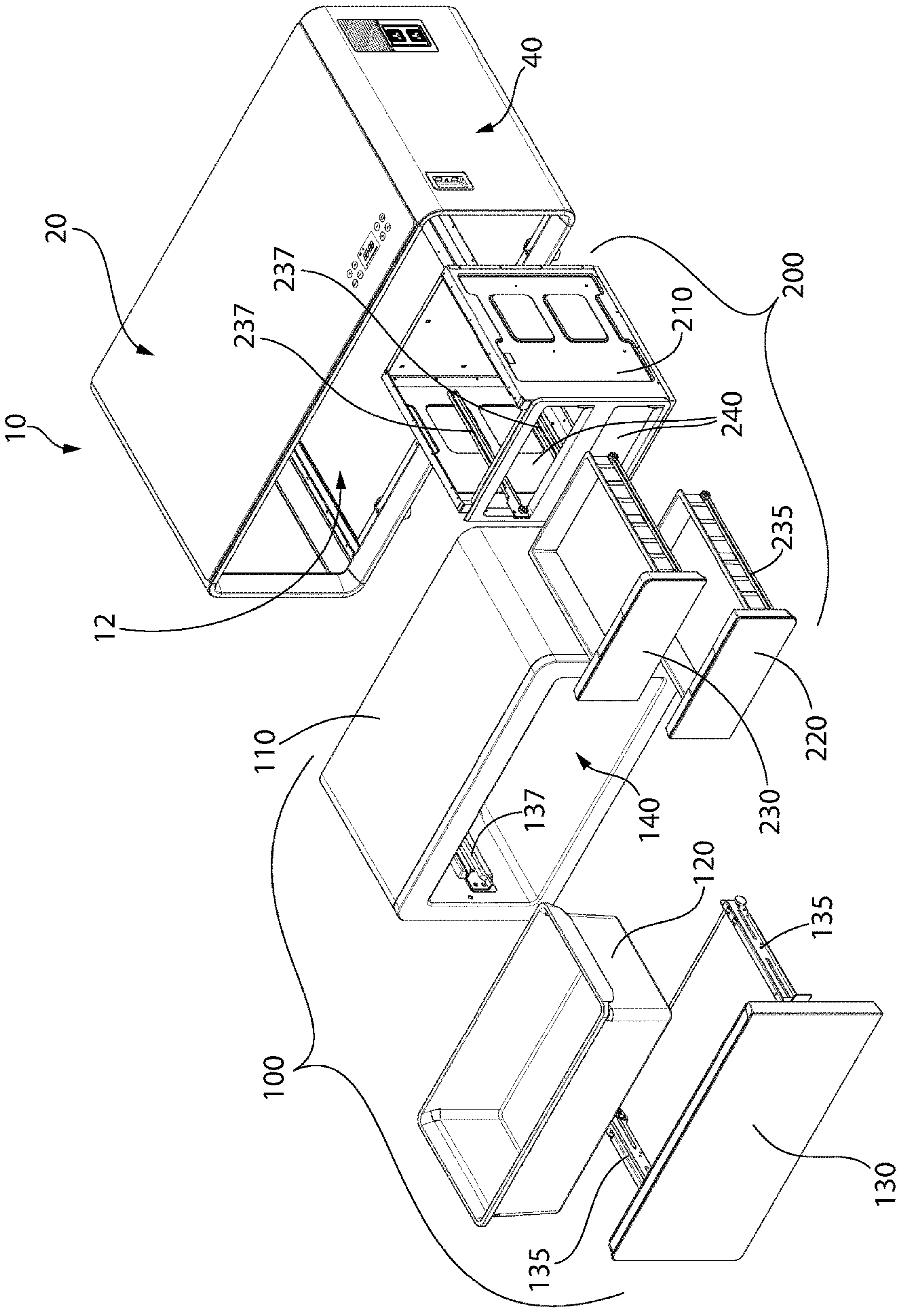
FIG. 4 is a first front perspective disassembled view of the table shown in FIG. 1.

FIG. 4 shows table 10 in more detail in an exploded view. Table 10 has primary cavity 12 in which refrigeration assembly 100 and storage assembly 200 can be located. Refrigeration assembly 100 includes a refrigeration housing 110 that is thermally insulated and forms the top, bottom, sides and rear of a refrigerated area 140. A tub 120 is supported by a drawer 130 that slides in and out of refrigerated area 140 on sliders 135/137. Beverages and food items that are to be refrigerated can be placed in tub 120 and are easily accessible when drawer 130 is pulled forward out of refrigerated area 140. In this embodiment, refrigeration assembly 100 can be installed in, and removed from, table 10 as a single unit for easy repair or replacement. Non-refrigerated storage assembly 200 includes a storage housing 210 that houses two drawers 220, 230 that are supported on sliders 235/237 within openings 240.

Figure 5:
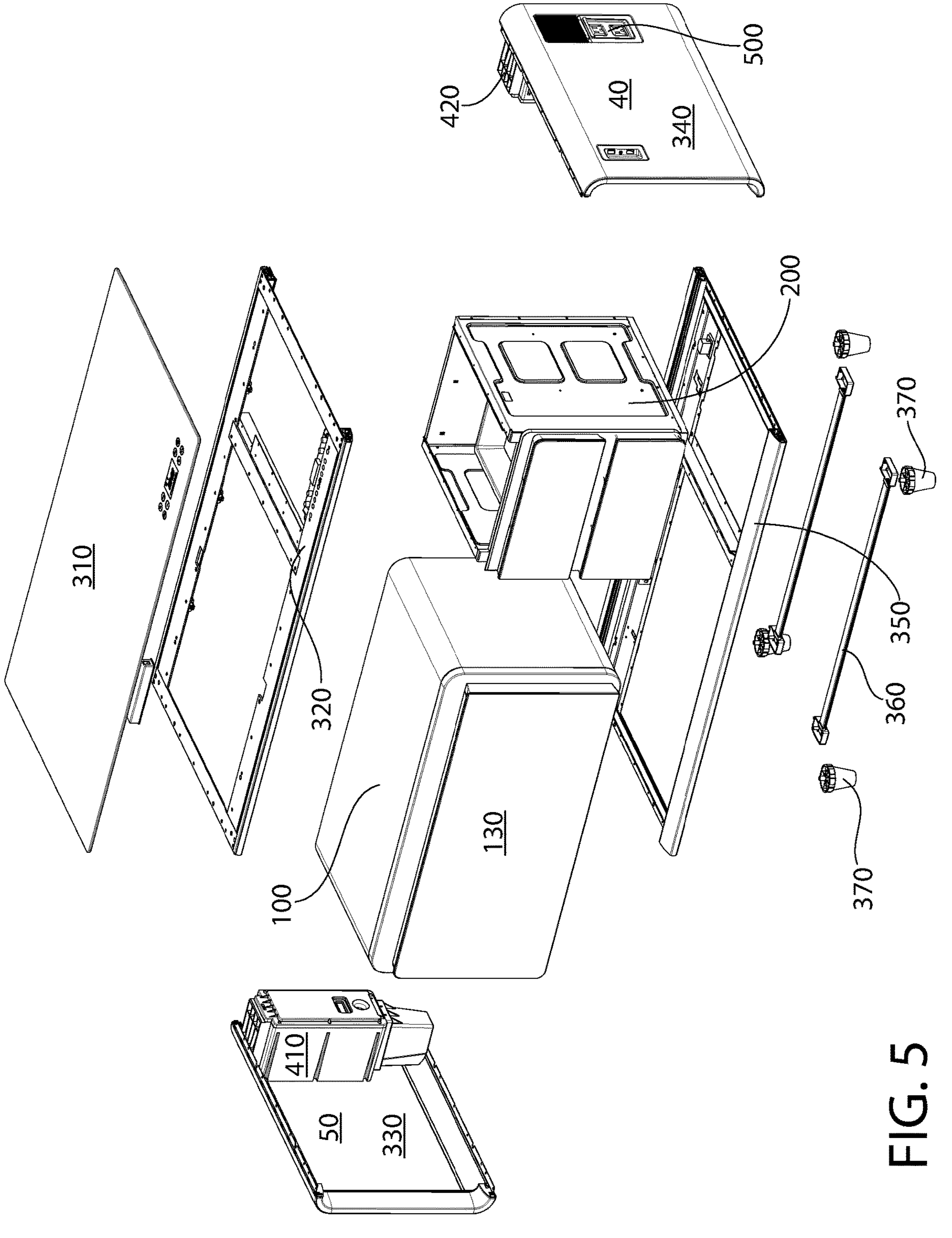
FIG. 5 is a second front perspective disassembled view of the table shown in FIG. 1.

FIG. 5 shows table 10 in detail in another exploded view. FIG. 5 shows the primary housing of table 10 as including side panels 330, 340, an upper frame 320 and a lower frame 350. An upper panel 310 is positioned above upper frame 320 and includes control section 700. Electronics associated with control section 700 can be located within control section 700 or remotely from control section 700. If the electronics associated with control section 700 are located remotely from control section 700, they can be located on or near the devices they control or they can be located at any other location in table 10. If the electronics associated with control section 700 generate a sufficient amount of heat that they benefit from cooling, the electronics can be located in the area behind refrigeration housing 110 and storage housing 210 or some other area where forced cooling is provided (described below). Lighting bars 360 provide light below table 10 for esthetic or other purposes. Lighting bars 360 can be LEDs or other types of lighting. Also, lighting bars 360 can alternatively or additionally be or include fluorescent or any other type of appropriate lighting. In this example four legs 370 are provided to support table 10 above the surface on which it rests. A different number of legs can be used to provide sufficient support for a table having a particular weight, for example, or for esthetic reasons. Different length legs can be provided if a different height above the surface is desired. If speaker housings 410, 420 produce a significant amount of bass, legs 370 having a longer or shorter length may be desirable to accentuate or suppress the bass level.

Figure 6:
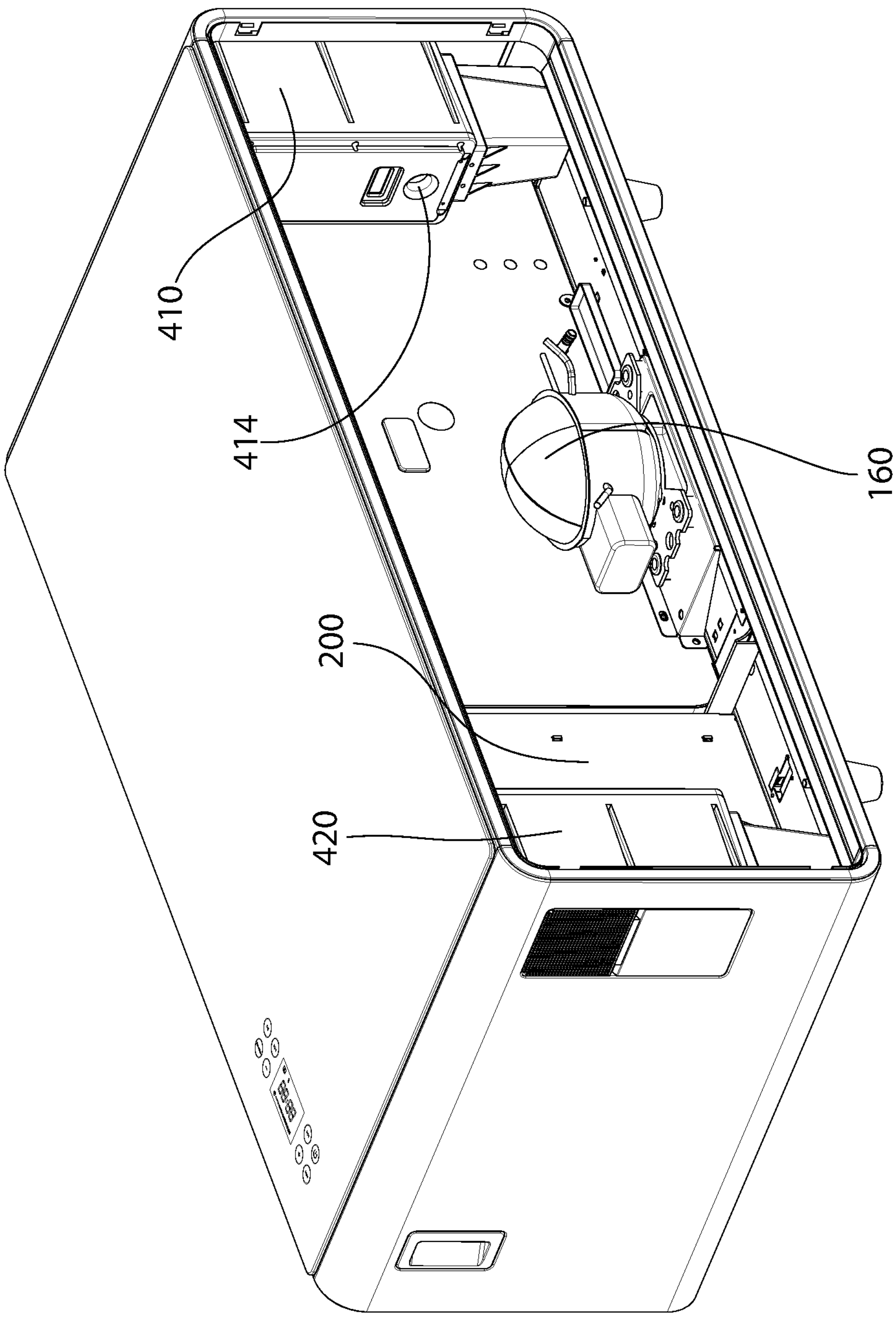
FIG. 6 is rear perspective view of the table shown in FIG. 1 with the back panel removed.
Figure 7:
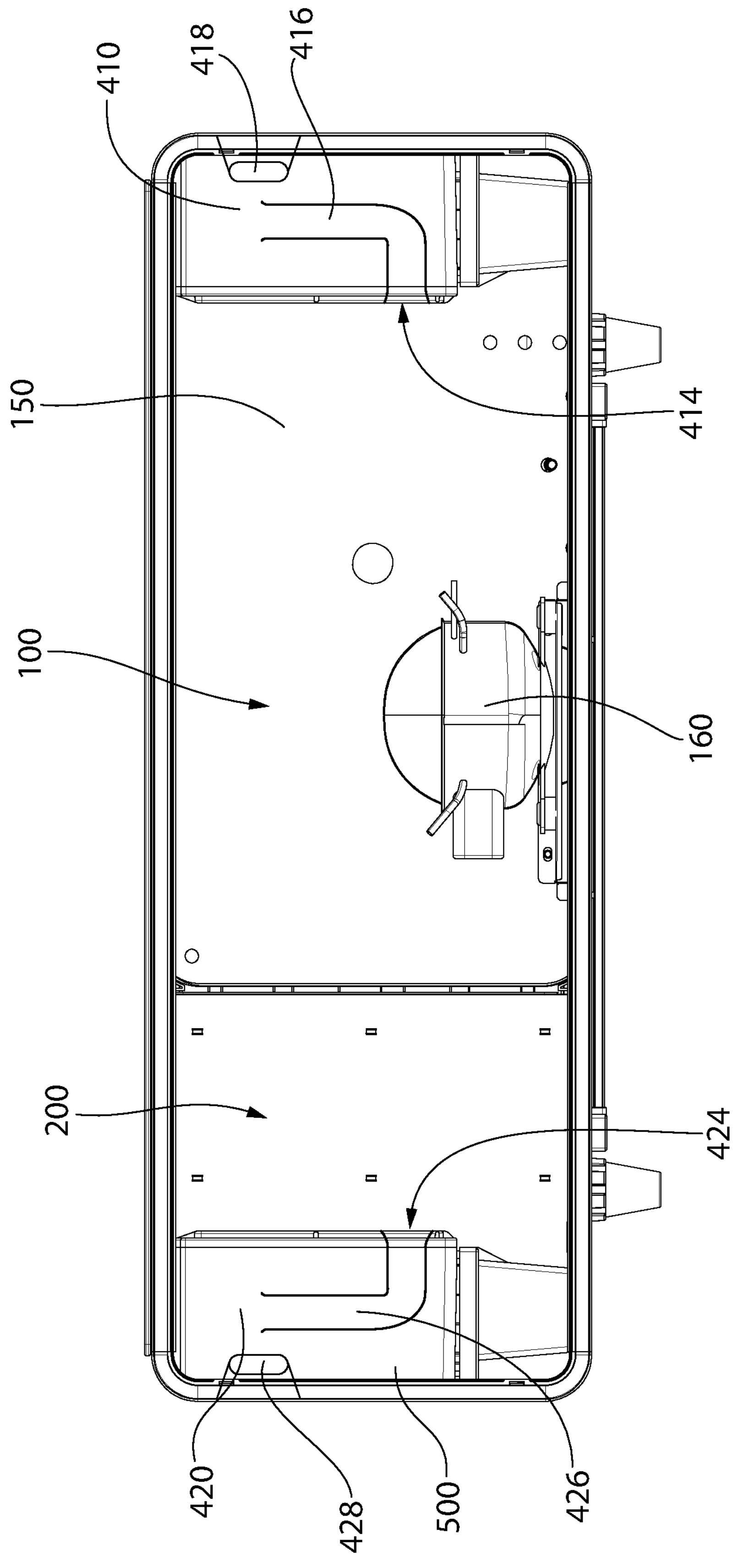
FIG. 7 a rear view of the table shown in FIG. 1 with the back panel removed.

Speaker housings 410, 420 are shown in more detail in FIGS. 5-7. In this embodiment, speaker housing 410 is mounted to side panel 330 and speaker housing 420 is mounted to side panel 340. FIGS. 6 and 7 show the relationship of speaker housings 410, 420 in an assembled state. In this example, speaker housing 410 has an air port 414 that allows air to be pushed by driver 418 through a resonator tube 416 and out of speaker housing 410 so that, among other things, driver 418 is subjected to the appropriate amount our back pressure when driver 418 moves during sound production. Resonator tube 416 can also act as a reverberation, or other, chamber to modify the sound projected by speaker housing 410. Similarly, speaker housing 420 has an air port 424 that allows air to be pushed by driver 428 through a resonator tube 426 and out of speaker housing 420 so that driver 428 is subjected to the appropriate amount our back pressure when driver 428 moves during sound production. Resonator tube 426 can also act as a reverberation, or other, chamber to modify the sound projected by speaker housing 420. More or no air ports and/or resonator tubes can be used or air ports and/or resonator tubes of a different size or shape can be used in particular embodiments. A columnar insert below each of speaker housings 410, 420. The columnar inserts can provide structural support for table 10 in order to better bear loads such as someone sitting on the rear edge of table 10. Also, the columnar supports can act as reverberation chambers for speaker housings 410, 420.

FIG. 7 shows a view from the back side of table 10 with the rear cover removed. A rear panel of storage housing 200 can be seen as well as a back wall 150 of refrigeration housing 100. In this example, refrigeration housing 100 includes a compressor 160 as well as other mechanical equipment in order to produce the refrigeration needed. Compressor 160 produces heat as heat is removed from the air inside refrigerated area 140. It can be advantageous to remove this heat to allow the refrigeration equipment to operate as designed. As drivers 418, 428 move to produce sound, air is moved in and out of air ports 414, 424. This air movement can cause otherwise stagnant air around compressor 160 to move and, as a result, increase the cooling of compressor 160.

Figure 8:
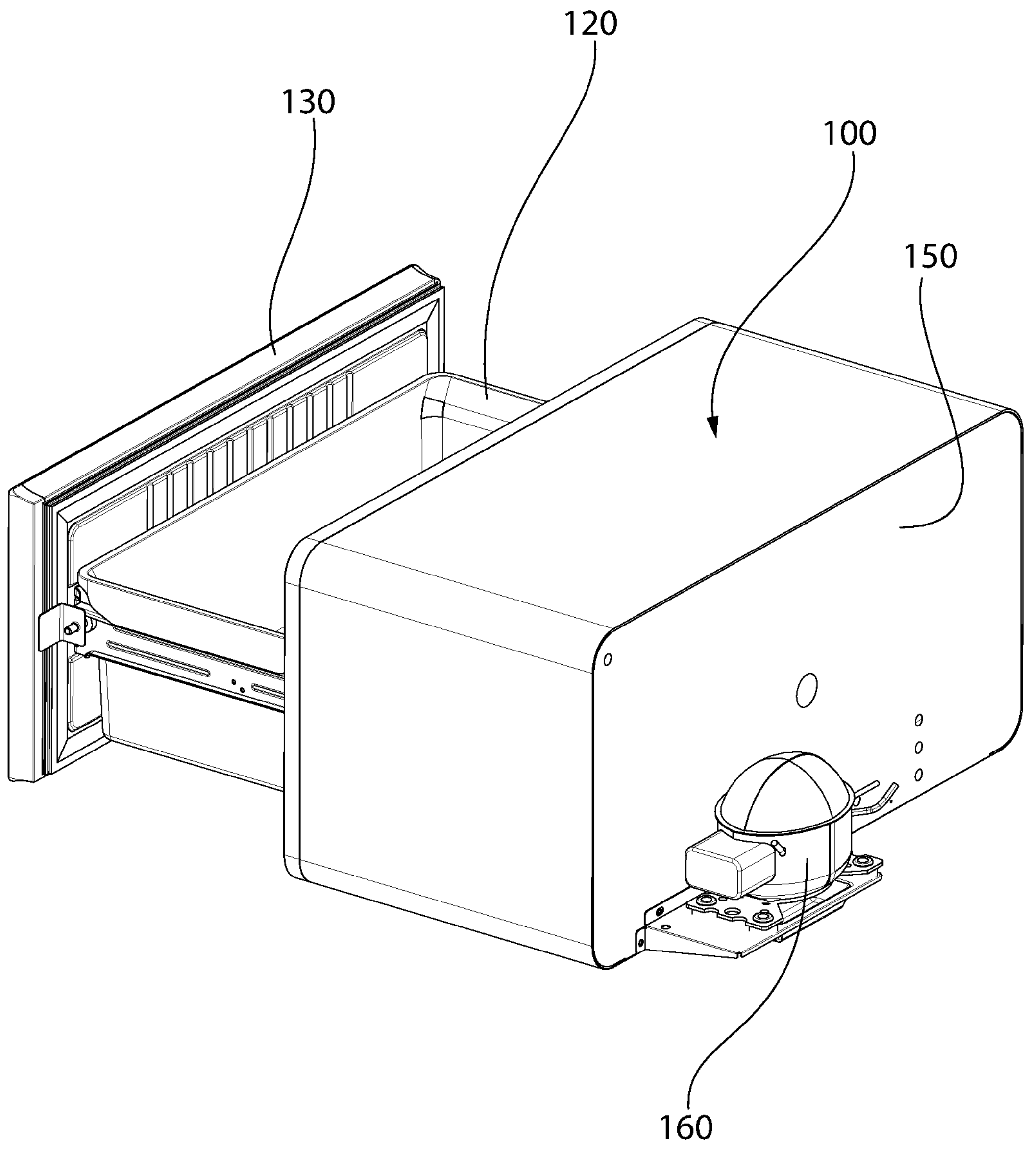
FIG. 8 is a rear perspective view of an example of a refrigeration housing of the table shown in FIG. 1.

FIG. 8 is a perspective view of the back of refrigeration housing 100 showing one possible placement of compressor 160 on back wall 150 of refrigeration housing 100. Compressor 160 can be located in other locations either on, or removed from, back wall 150. In one embodiment, compressor 160 may be configured and operable to cool contents of refrigerated drawer 1130 to a range of about and including 53-68 degrees F. (Fahrenheit) as one non-limiting example via thermoelectric cooling.

Figure 9:
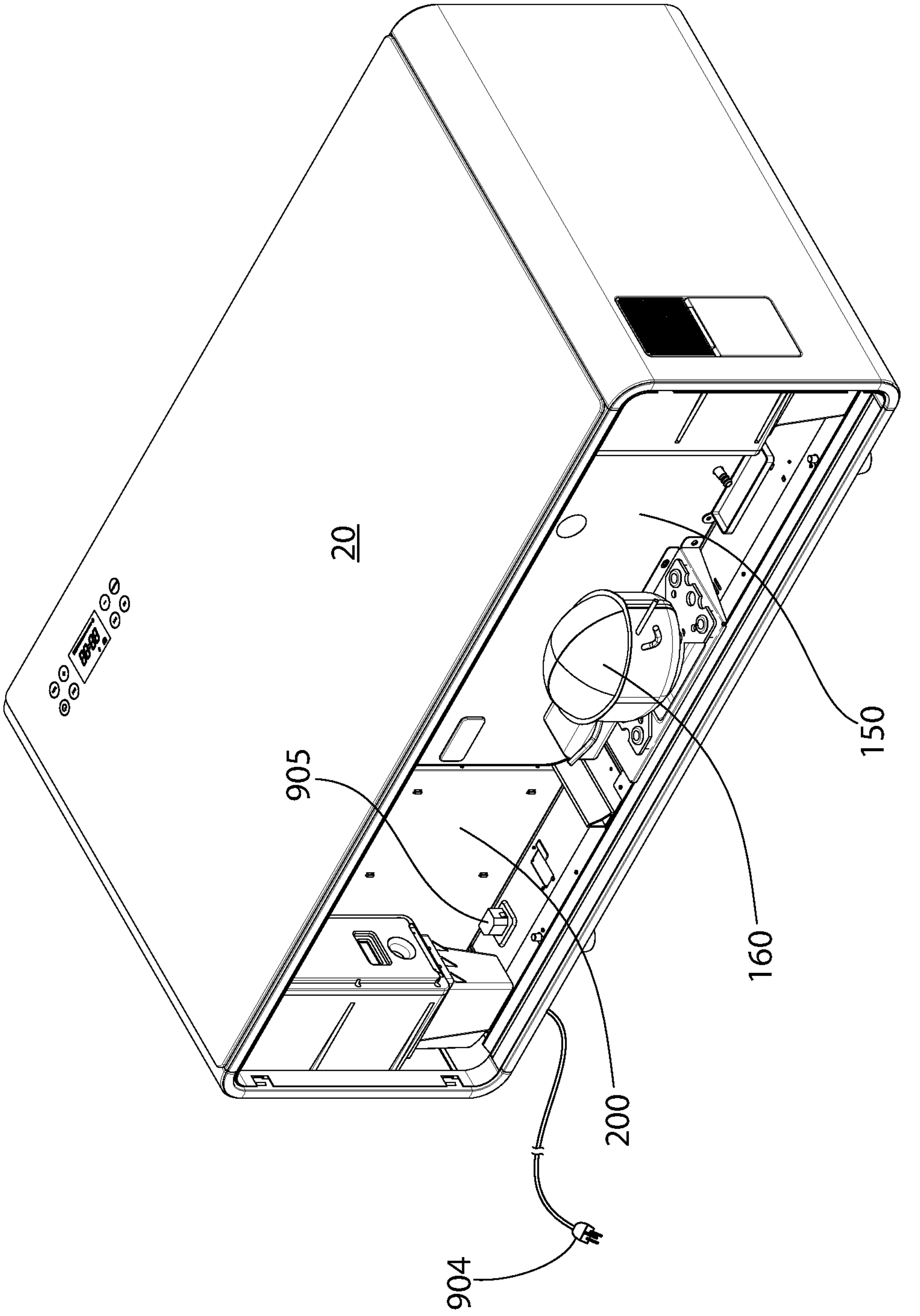
FIG. 9 a rear perspective view of the table shown in FIG. 1 with the back panel removed.
Figure 10:
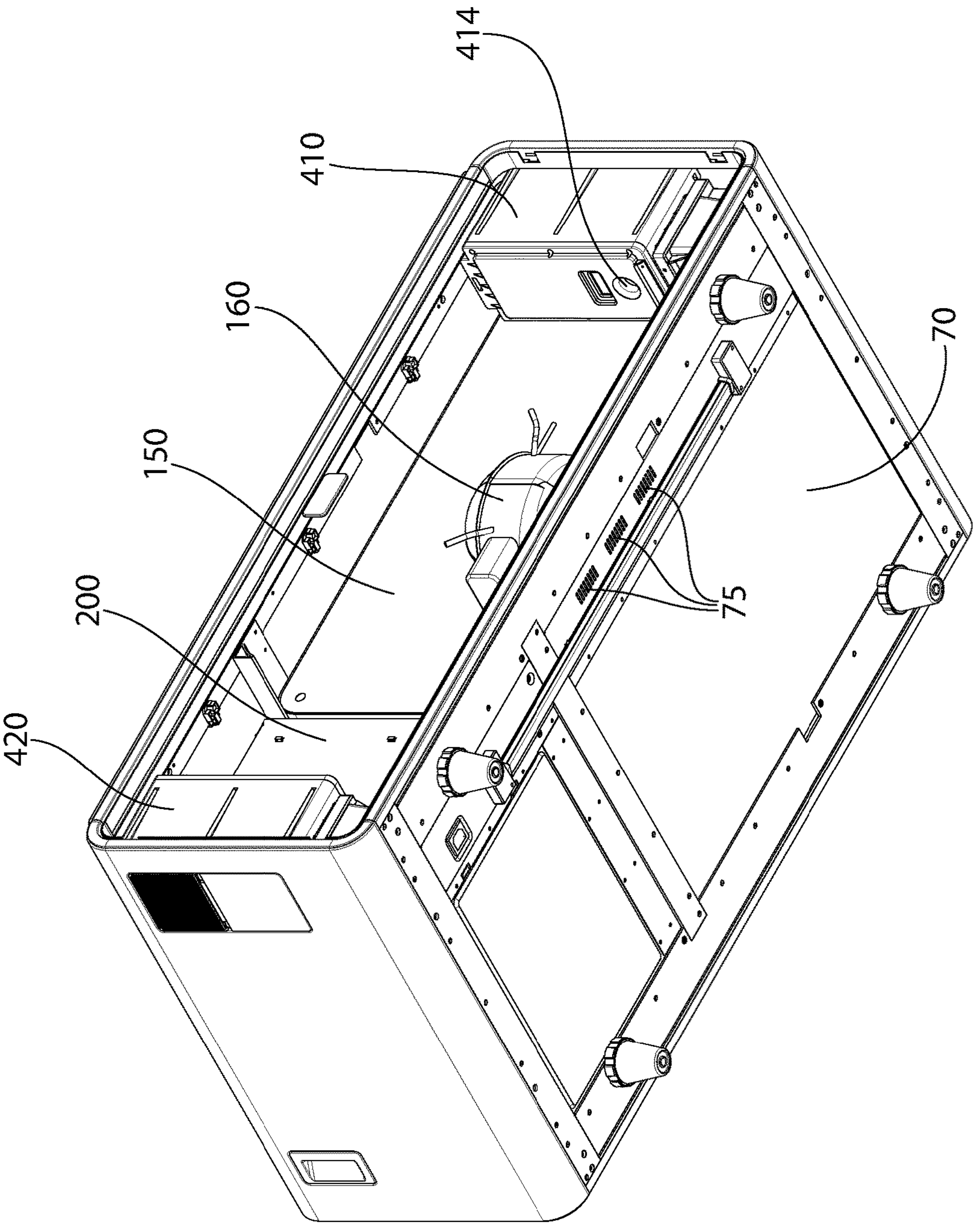
FIG. 10 is rear perspective view of the table shown in FIG. 1 with the back panel removed.

FIGS. 9 and 10 show the rear of table 10 with the back panel removed and illustrate the relative locations of compressor 160 and air ports 414, 424 of speakers housings 410, 420 each including at least one speaker operable to produce sound. These views illustrate how air moved in and out of air ports 414, 424 can cause air to move around compressor 160.

It is noted that table 10 can have a power cord 902 that plugs into a power socket 905 on one end and at the other end to an available 120V building electrical power receptacle, thereby providing electric power for a main power supply or bus (not shown) of the table 10 (see, e.g. FIG. 9). The power bus is hardwired to and provides power to electrical devices such as refrigeration housing 100, speakers, lighting, and the various power outlets and ports integrated into the table which require a source of electric power. Other examples of table 10 may be battery powered and either do not have a power cord, or have a power cord that is only plugged into the building power receptacle to charge batteries located either in or adjacent to table 10.

FIGS. 6 and 7 show a compressor chamber defined by the back wall 150 of refrigeration housing 100, the rear panel of storage housing 200, speaker housings 410, 420, a portion of lower frame 350, a portion of upper frame 320, and the rear panel (not shown in these views) of table 10. Compressor 160 resides in this compressor chamber and is surrounded by the air in the compressor chamber. As discussed above, air movement in the compressor chamber can be important to provide proper heat transfer from compressor 160. This air movement can be achieved by, for example, air being moved by drivers 418, 428 and/or air passing through the various ventilation openings discussed above or other ventilation openings.

Figure 11:
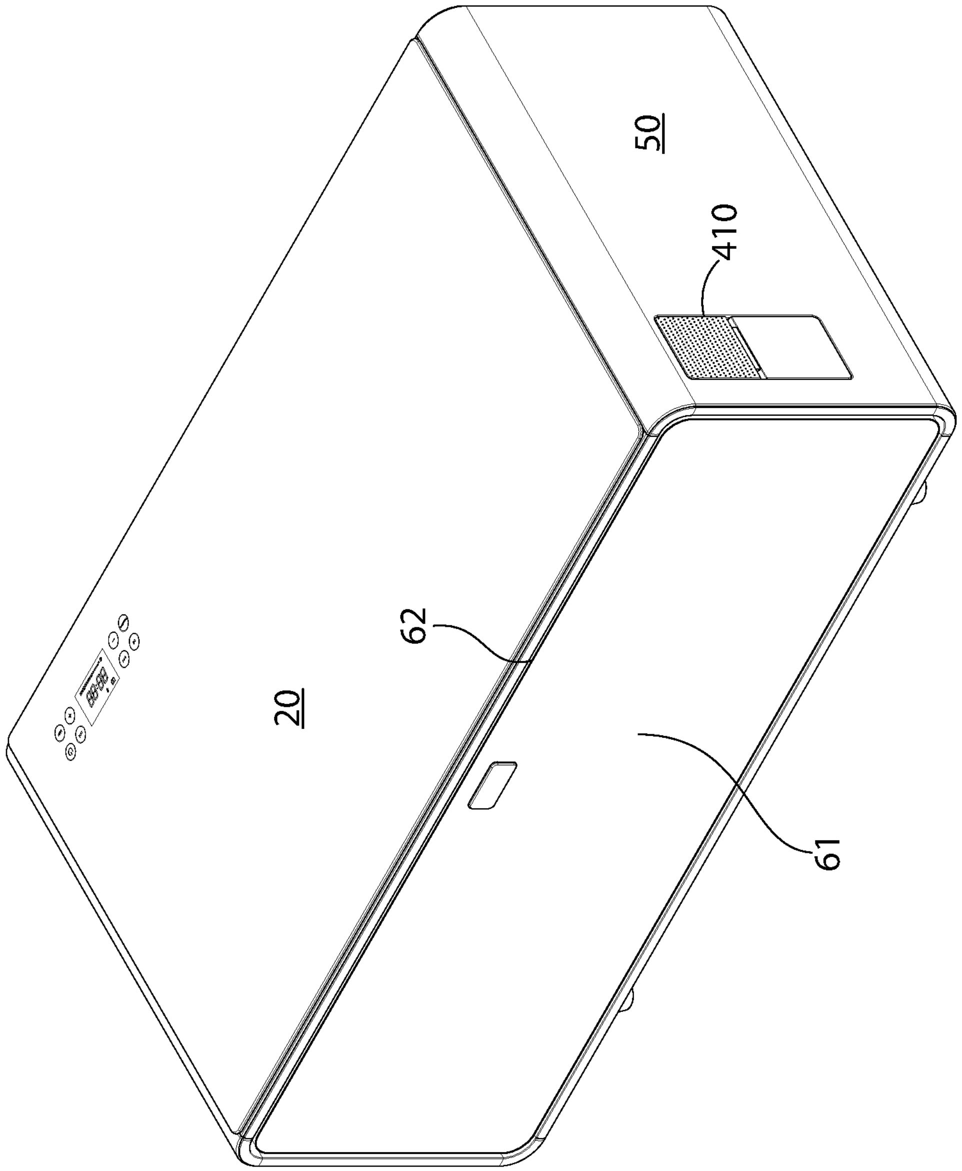
FIG. 11 is a rear perspective view of the table shown in FIG. 1 with an alternate back panel.
Figure 12:
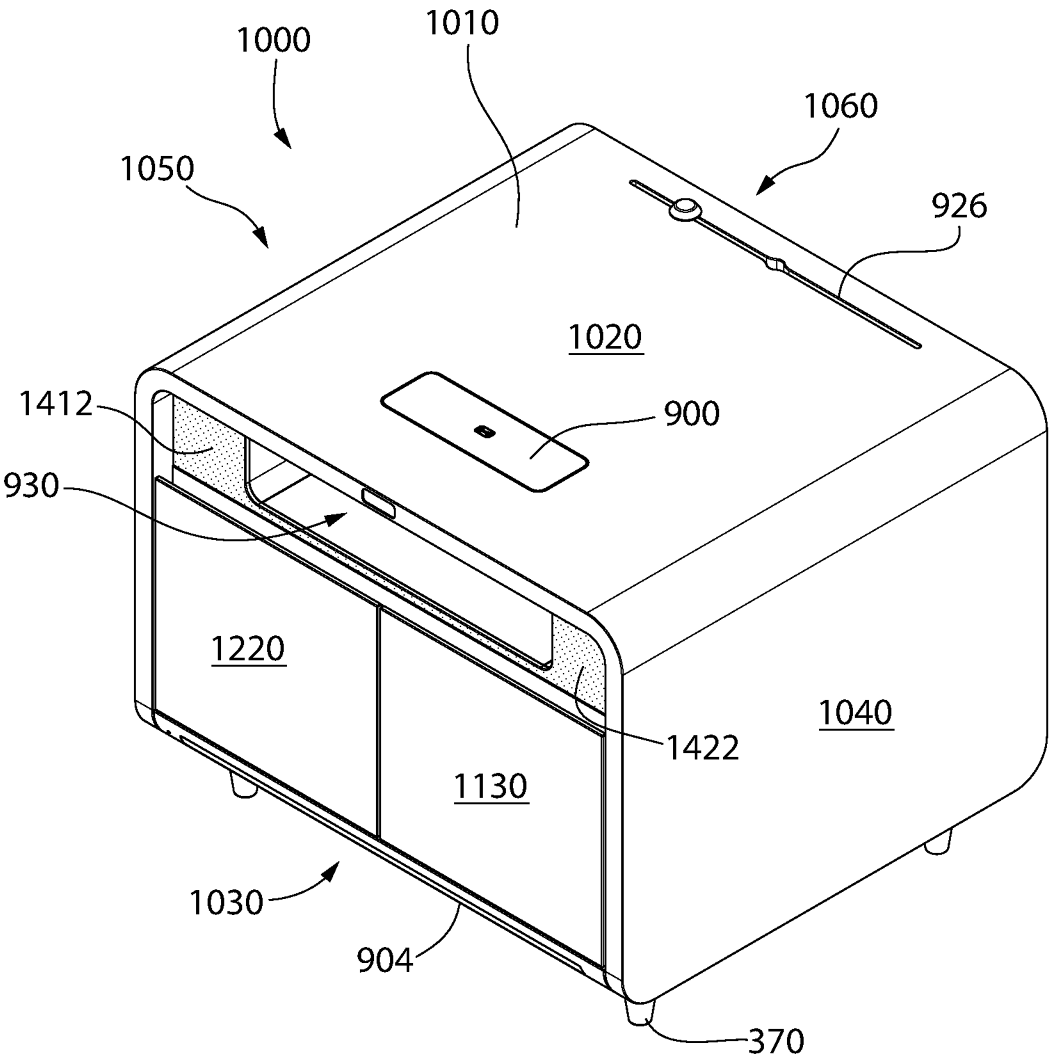
FIG. 12 is a front perspective view of a second embodiment of a multi-function table according to the present disclosure.
Figure 13:
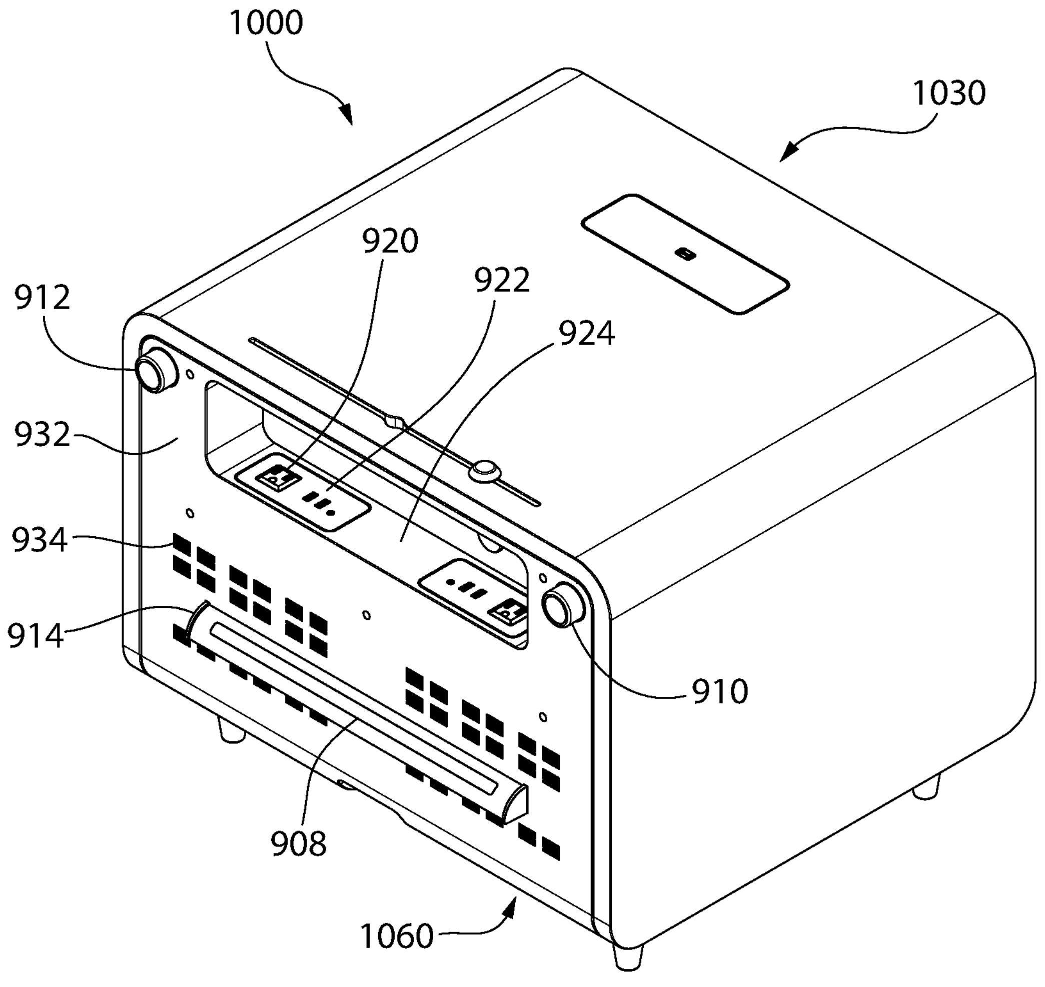
FIG. 13 is a rear perspective view of the table shown in FIG. 12.
Figure 14:
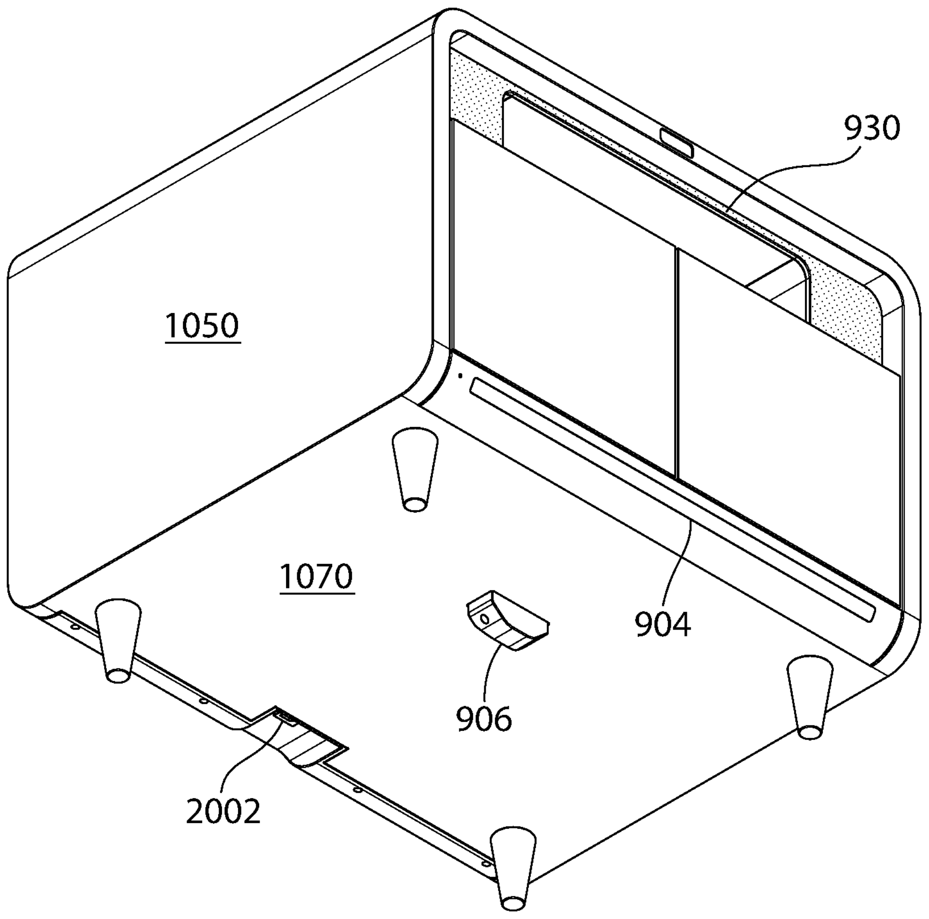
FIG. 14 is a bottom perspective view of the table shown in FIG. 12.
Figure 15:
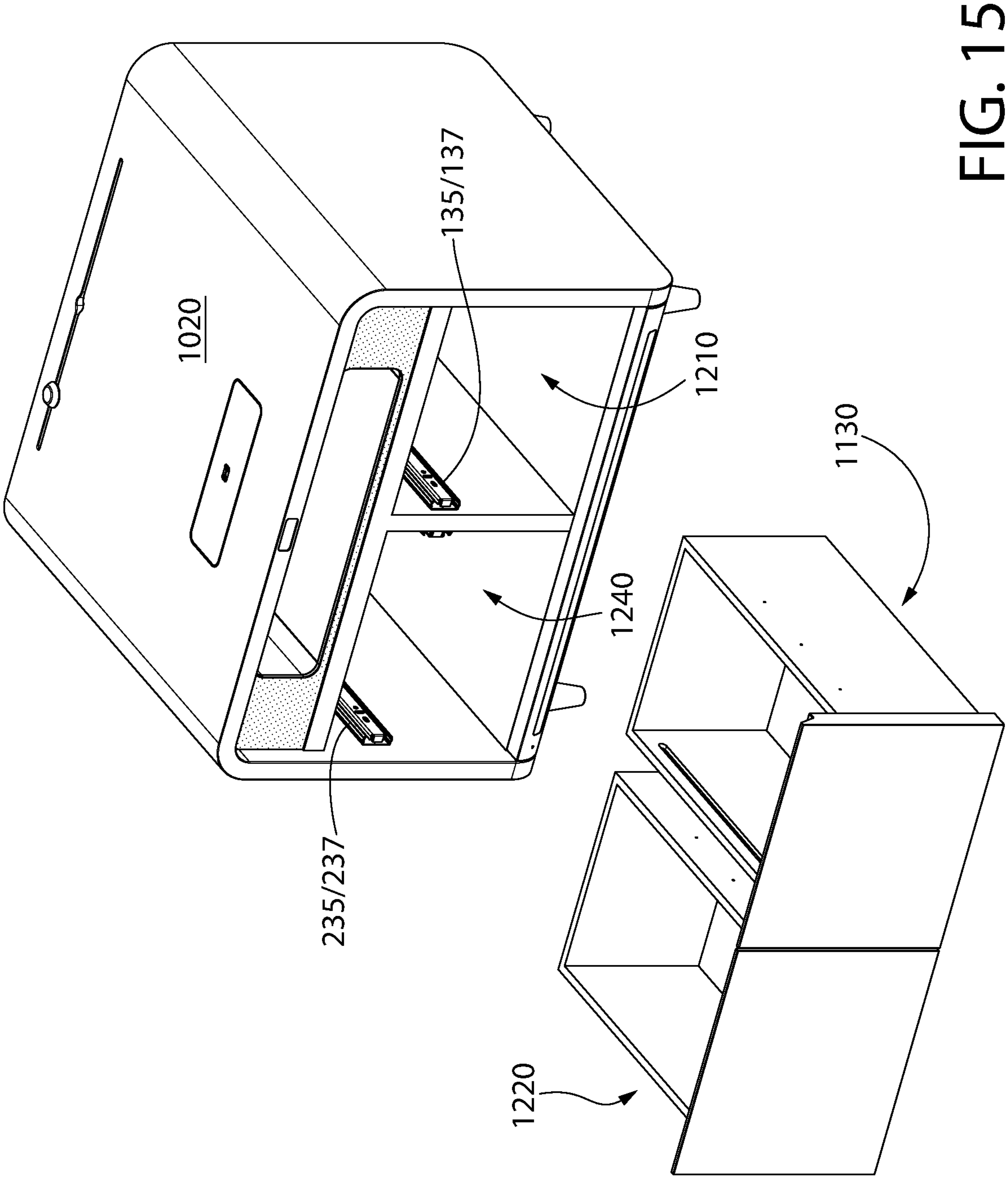
FIG. 15 is a front perspective disassembled view of the table shown in FIG. 12.

FIG. 11 shows an alternate example of a back panel of table 10. In this example, a panel 61 is surrounded by a gap 62 that allows air to pass in and out of the space in which compressor 160 is located. Gap 62 can provide or assist in providing sufficient air flow to properly cool compressor 160 and/or other equipment that may require cooling. In this example, gap 62 is configured to have a similar appearance to the gap around the drawers on the front side of table 10, while simultaneously providing air flow.

FIGS. 12-19 illustrate an embodiment of a furniture unit in the form of a smart side table 1000. Side table 1000 may be used as a nightstand and embodiments can include features geared toward such usage. Side table 1000 may share many similar construction details and features with coffee table 10 already described herein. Accordingly, the present side table will be described with brevity to avoid repetition. Particular aspects which distinguish side table 1000 from coffee table 10 will be noted.

Esthetically, side table 1000 may be similar in contour, profile, and configuration to coffee table 10 to form a coordinated set when paired with table 10. Side table 1000 however is smaller in at least length than coffee table 10 making it more amenable to function as a side table or night stand. Side table 1000 may therefore have a length less than twice the height of the front side 1030.

Side table 1000 has a primary housing or base comprising a plurality of panels including top panel 2021, bottom panel 2022, right side panel 2023, left side panel 2024, and removable rear panel 1932 which define a forwardly open primary cavity 2030. The cavity 2030 may divided by a vertical division wall 2031 into a refrigerated opening 1210 and non-refrigerated opening 1240. The plurality of panels define a top 1010 defining a horizontal top or upper surface 1020, a front side 1030, a right side 1040, a left side 1050, a rear side 1060 and a bottom 1070. Table 1000 has a rectangular parallelepiped or cuboid configuration in one non-limiting embodiment. This example is a table with a horizontal rectangular upper surface, a horizontal rectangular bottom, and vertical rectangular front, back and sides. Adjoining corner regions between these may be rounded in one embodiment as shown similarly to table 10. Other embodiments of the invention, however, can have a different number of sides, use shapes other than rectangles, and use angles other than 90°. In this example, upper surface 1020 is flat and covers substantially all of the entirety of the table from side to side and front to rear. A plurality of legs 370 elevates the side table 1000 above the floor similarly to table 10.

Figure 17:
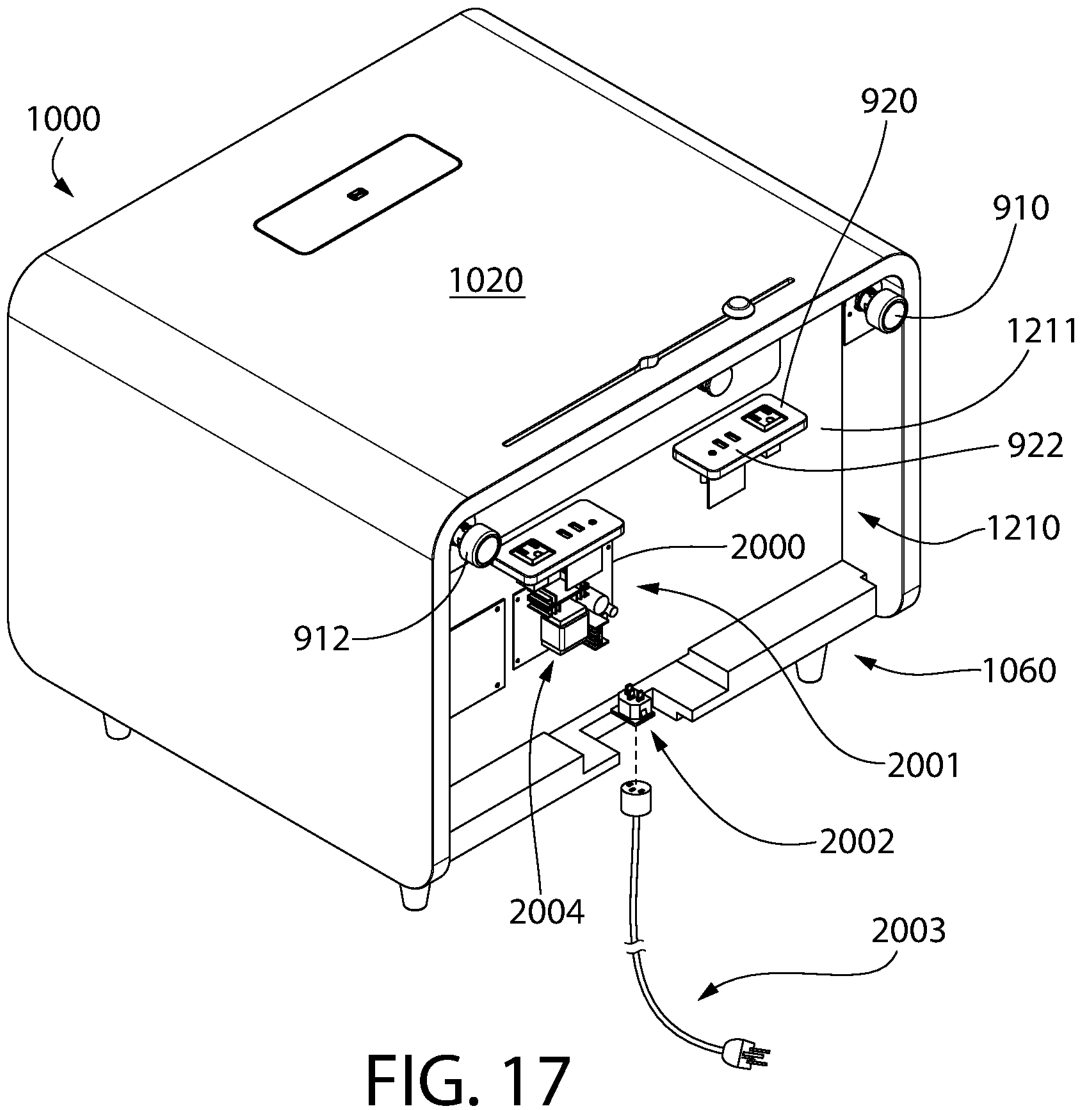
FIG. 17 is rear perspective view of the table shown in FIG. 12 with the back panel removed.
Figure 18:
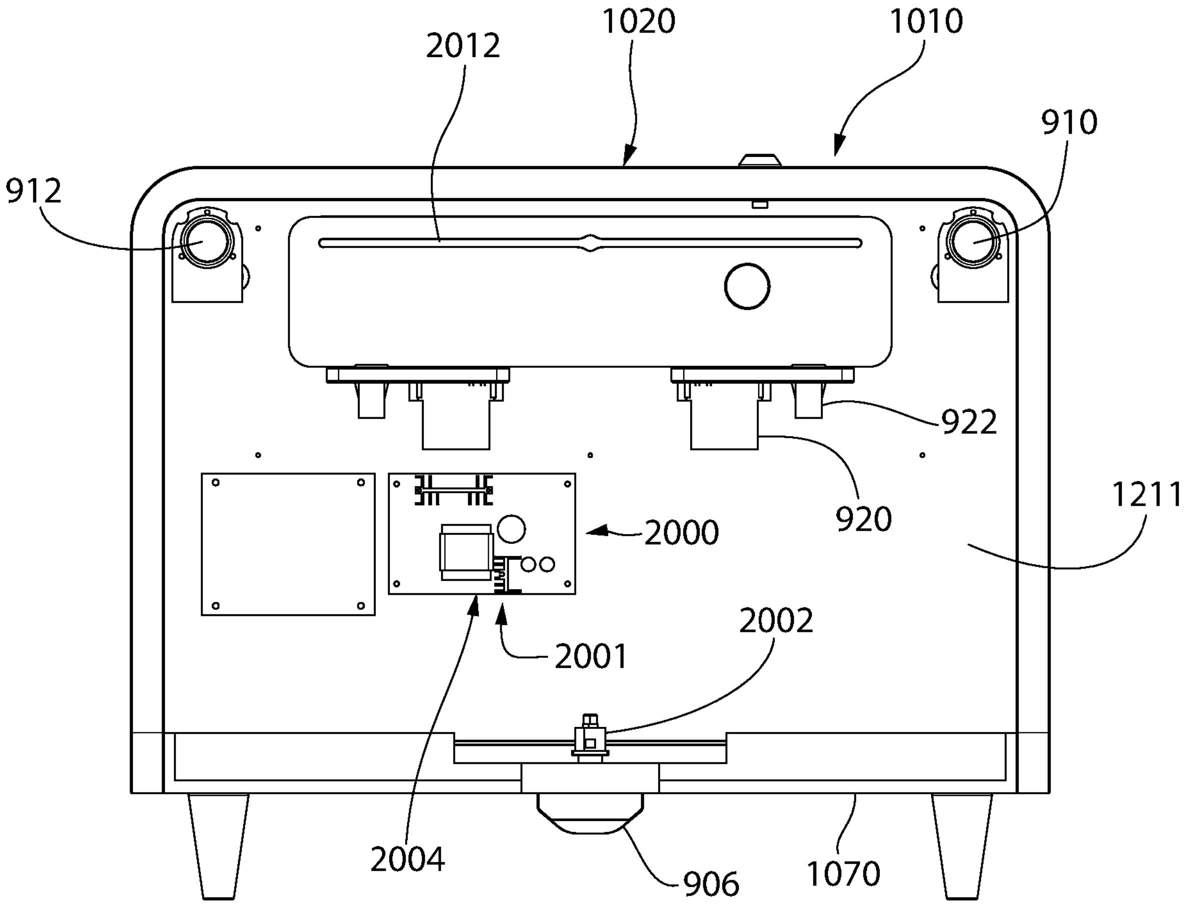
FIG. 18 a rear view of the table shown in FIG. 12 with the back panel removed.
Figure 19:
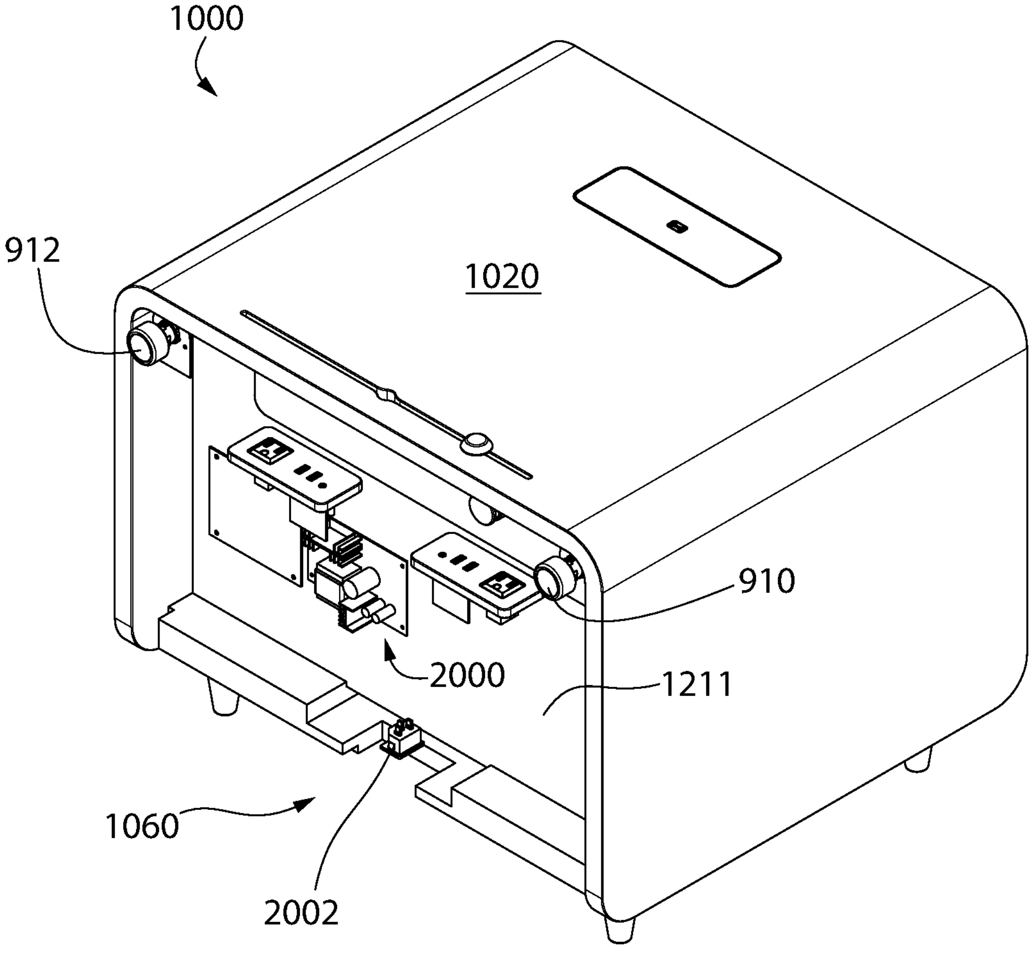
FIG. 19 is a second rear perspective view of the table shown in FIG. 12.

A removable rear panel 1932 may be provided on rear side 1060 of side table 1000. Rear panel 1932 conceals the refrigeration unit assembly 100 and its compressor 160 arranged at the rear side of the table 1000 in a manner similar to that already shown in FIG. 6 for table 10. The compressor 160 is not shown in FIGS. 17-19 for clarity. Since side table 1000 is designed for ordinary placement along a wall as opposed to coffee table 10, a plurality of cooling openings 934 may be formed in the rear panel 1932 for inducing airflow into compartment 2010 formed between a rear internal wall 1211 of the table 1000 and rear panel 932 and cooling the compressor housed therein when the rear panel is attached to the table. In one embodiment, the power outlets 920, USB ports 922, PCB with controller 2000, and other devices may be mounted to the inner wall 1211 as best shown in FIG. 17.

Similarly to table 10, side table 1000 includes refrigeration unit or assembly 100 and non-refrigerated storage unit or assembly 200 with access to the user via openings from the front side 1030. These units may be arranged side by side similarly to table 10. In this example, refrigeration assembly 100 may be accessed by a single sliding drawer 1130 manually movable by the user into and out of the refrigerated opening 1210 in table 1000 via sliders 135/137. A smaller internal drawer 2008 may be provided which is nested inside drawer 1130 for organizing storage of refrigerated items in drawer 1130. Drawer 1130 is configured for holding multiple refrigerated items (e.g. beverage containers, snacks, food, etc.). The drawer 1130 is cooled by compressor 160 (see, e.g. FIG. 16) mounted at the rear of the table 1000 in a manner similar to refrigerated drawer 130.

Non-refrigerated storage assembly 200 includes a single sliding drawer 1220 in this case supported on sliders 235/237 within a non-refrigerated opening 1240. Construction and details of refrigeration assembly 100 and non-refrigerated storage assemblies 200 were previously described herein. Other embodiments of side table 1000 may have different numbers of drawers and/or pivoting doors instead of drawers, or a combination of the two.

Side table 1000 may further include a frontally open storage compartment 930 disposed between the upper surface 1020 and drawers 1130 and 1220. This provides ready-access storage for any of numerous items, such as books, magazines, personal electronic devices 2060 (see, e.g. FIG. 20), etc.

Side table 1000 further includes a wireless charging pad 900 integrated into the upper surface 1020 of the table for recharging electronic devices such as cell phones, watches, etc. Charging pad 900 comprises associated electrical/electronic circuitry coupled to a power supply for forming a fully functional wireless charging station. This technology is commercially available and it is well within the ambit of those skilled in the art to provide a wireless charging pad without further elaboration.

Side table 1000 further includes a motion-activated front light bar such as LED (light emitting diode) strip 904 disposed near the bottom of the front side 1020. A motion sensor 906, which may be disposed on the bottom 1070 of side table 1000, is configured to detect motion in front of the table and activate the LED strip 904 when a user passes near the front side 1030 of the table. In one embodiment, sensor 906 may be configured for detecting motion in a 35-45° angle and 3 meter circumference as a non-limiting example. Sensor 906 is operably and communicably coupled to LED strip 904. Control circuitry associated with the LED strip 904 may include a timer circuit to terminate power to the strip and light emission after a preprogrammed period of time if no further motion is detected in the interim by motion sensor 906. The timing may be controlled by programmable controller 2000 via a software application ("app") running on a user's personal electronic device 2060.

Additional lighting provided with side table 1000 may include a rear light bar such as LED strip 908 disposed on the rear side 1060 of the table. LED strip 908 and associated circuitry may be configured to provide accent or ambience lighting in one embodiment which is variable in intensity and color. The LED strip 908 is operable to change between a plurality of user-selectable colors of the visible spectrum (e.g. red, orange, yellow, green, blue, indigo, and violet) via a rotatable lighting control knob 910 mounted on rear side 1060. Alternatively, the rear lighting may be remotely controlled via a software application ("app") running on an external personal electronic device (e.g. cell phone, pad, tablet, etc.) wirelessly communicating with the lighting system via a wireless interface. The intensity (i.e. visible level) of lighting may be controlled via the lighting control knob 910 or the software app. In one embodiment, the rear LED strip 908 may be integrated into a semi-circular support hood 914 extending for at least the length of the LED strip, and preferably longer as shown. Hood 914 is configured to direct light emitted by LED strip 908 rearward and upwards at an angle to vertical for producing the ambience lighting effect which shines on building wall adjacent to the rear of side table 1000. The wall acts as a display surface for the lighting effects.

In one embodiment, the rear LED strip 908 and associated circuitry may be configured to selectively simulate a sunrise for use of side table 1000 as a nightstand. The intensity of light generated by the LED strip 908 may gradually increase over time during a wake-up lighting sequence. The circuitry may be configured and preprogrammed via the software app running on the external personal electronic device 2060 to initiate the LED strip 908 lighting at a user preselected wake-up time.

Side table 1000 further includes audio speakers similarly to coffee table 10 already described herein, albeit the present speaker housings 1410, 1420 may configured and arranged differently on the table. As shown in the figures, speaker housings 1410, 1420 are disposed on right and left sides of the table 1000 and may extend for substantially the entire front to rear depth of the table for improved bass response. The speaker drivers 1418, 1428 are disposed on the front side 1030 of table 1000 to project sound in a forward direction from the table 1000. Each speaker housing 1410, 1420 includes a speaker cover grille 1412, 1422 in a similar manner to table 10 to conceal and protect the drivers. In lieu of separate speaker cover grilles, they may be combined into a single grille which covers both speaker drivers 1418, 1428 as shown. A speaker knob 912 may be disposed on the rear side 1060 of table 1000 is operably coupled to audio circuitry in the table to control the volume of sound produced by the speakers.

Figure 16:
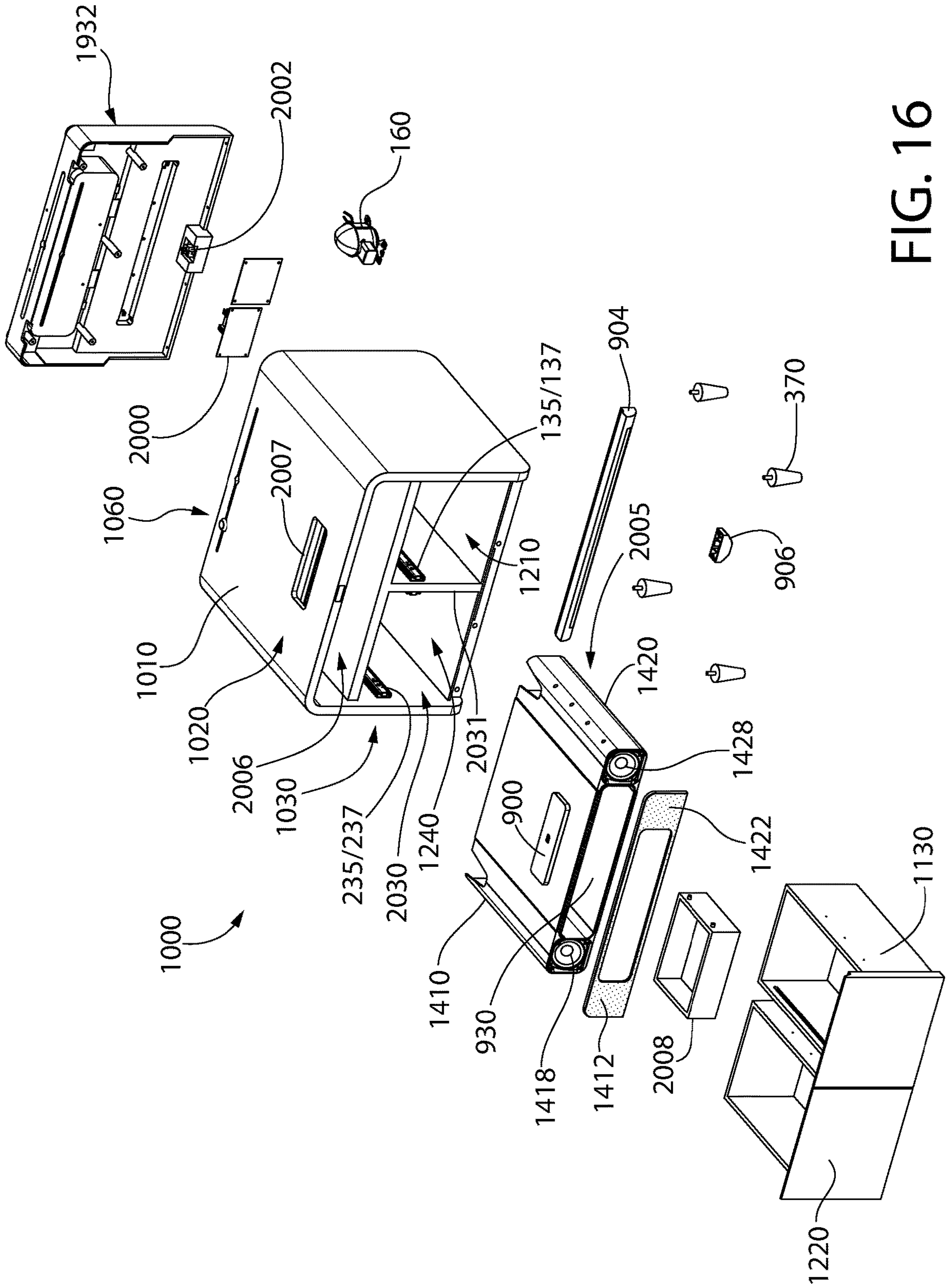
FIG. 16 is a front perspective exploded view of the table shown in FIG. 12.

In one embodiment, the speaker housings 1410, 1420, wireless charging pad 900, and frontally open storage compartment 930 may be incorporated into a single insertable and removable speaker insert 2005 shown in FIG. 16. The speaker insert 2005 advantageously simplifies construction and speeds assembly of the side table 1000. Speaker insert 2005 is configured for insertion into a frontally open receptacle 2006 formed in table 1000 above the drawers. The top surface 1020 of side table 1000 contains an opening 2007 configured for receiving the wireless charging pad 900 on the housing insert 2005 therein.

Figure 20:
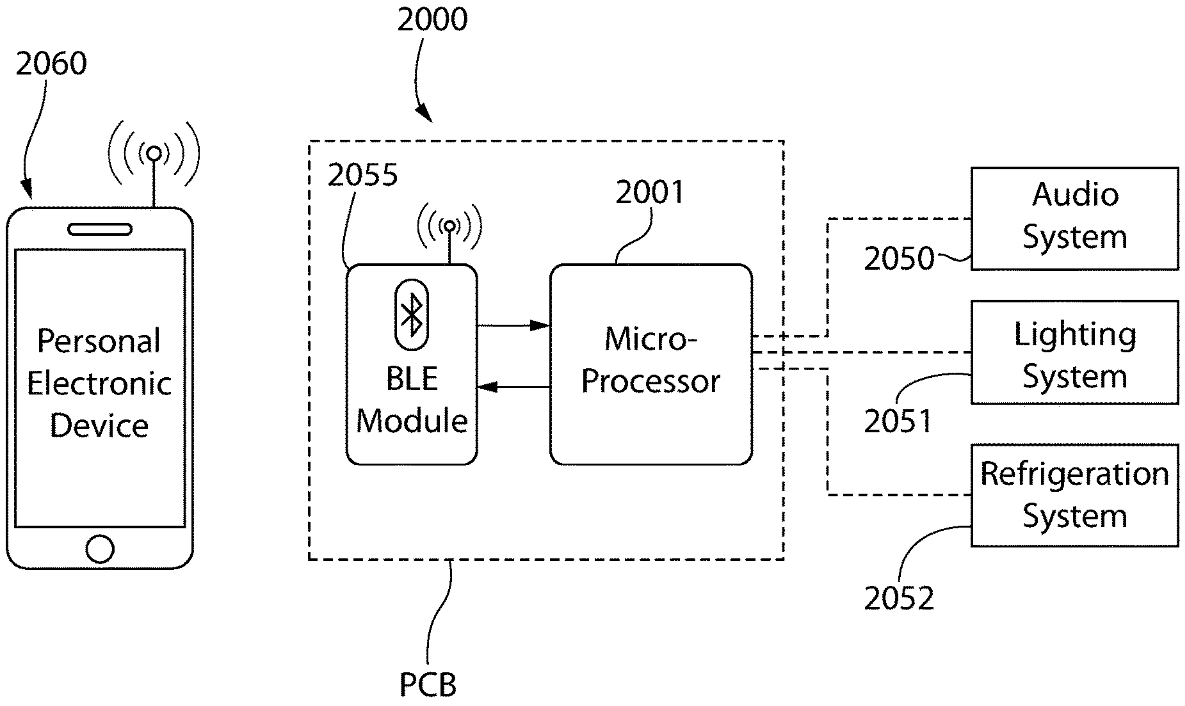
FIG. 20 is a schematic diagram of one embodiment of the control system of the table showing a microprocessor and wireless communication links for connection to a personal electronic device.

With additional reference to FIG. 20 showing the table control system, the lighting system 2051 (comprising the foregoing front light bar 904 and rear light bar 908), audio system 2050 (comprising the foregoing speaker drivers 1418, 1428), refrigeration system 2052 (comprising compressor 160, etc.), and other electric/electronic features of the table 1000 may be controlled by a printed circuit board (PCB) comprising a programmable microprocessor 2001 which defines a programmable controller 2000. These systems and features are operably and communicably coupled to the controller 2000 via wired and/or wireless communication links or pathways formed within the table. Besides microprocessor 2001, the PCB includes all usual ancillary electronic devices necessary for forming a fully functional programmable controller which may include for example without limitation volatile and non-volatile memory, non-transitory tangible computer-readable medium for storing data and control logic or program instructions (software) executed by the microprocessor 22001, wired and wireless communication interfaces or ports, sound card, a power supply, etc. Microprocessor 2001 can communicate wirelessly such as via Bluetooth (see, e.g. Bluetooth module 2055 on PCB), Wi-Fi, NRC, etc. with a user's external personal electronic device 2060 (e.g. cell phone, pad, tablet, etc.) via the communication interface for programming and controlling the microprocessor, and updating firmware executed by the microprocessor 2001. Microprocessor 2001 may be programmed and configured to execute the control logic instructions which may direct and control operation of the lighting system, audio system, refrigeration unit, and other appurtenances disclosed herein so that these systems and devices perform in the manner described.

In one embodiment, the programmable controller 2000 may further include circuitry and devices configured for providing a white noise generator. The white noise, which may comprise several user selectable sounds, are played through the audio system and speaker drivers 1418, 1428 for use when a user sleeps or simply relaxes or meditates.

Side table 1000 further includes a plurality of 120V electrical outlets 920 and USB ports 922 similarly to table 10. In one embodiment, the outlets and ports may be arranged within an elongated rearwardly open cavity 2014 formed in removable rear panel 932 which defines a connectivity station 924 arranged at the rear side 1060 of table 1000. This allows devices requiring either a 120V device (e.g. lamp, charging block, clock, etc.) or USB connection for an external electronic device (e.g. cell phone, notebook, pad device, etc.) for charging and/or direct connectively interface to be accommodated and powered by the table 1000. In one embodiment, an elongated cord pass-through slot 926 may be formed through the top 1010 and upper surface 1020 of side table 1000 to provide cord management and connection to external electronic devices which might be placed on the upper surface 1020 of the table. An elongated upper pass-through slot 926 is disposed in the top 1010 proximate to the rear end of the table upper surface 1020 and extends horizontally between the right and left sides 1040, 1050 of side table 1000. In addition, a second elongated lower pass-through slot 2012 is disposed within rear cavity 2014 of the table 1000 which extends forward through rear inner wall 1211 into the storage compartment 930 beneath the table upper surface 1020. This allows connection to external personal electronic device (e.g. cell phone, pad, tablet, etc.) which might be placed inside the storage compartment 930.

The rear side 1060 of side table 1000 may include a power socket 2002 for connection to a power cord 2003 to provide electric power to the table. Power cord 2003 in turn is connected to an available 120V power outlet of the building/dwelling located proximate to the table. Power socket 2002 may be electrically connected to a power distribution block 2004 having wiring pin connectors or terminals for a wiring harness (not shown) to distribute electric power to the PCB 2000, audio system, lighting systems, refrigeration system, electrical outlets and USB ports, wireless charging pad, etc. already described herein. In one possible embodiment, power distribution block 2004 may be disposed on the PCB 2000 assembly. Other mounting locations in table 1000 for the distribution block 2004 may be used.

As can be seen from this disclosure, the invention (including tables 10 and 1000) provides a solution to at least the problem of providing convenient access to refrigerated or frozen items in an esthetically pleasing way in very close proximity to seating. In addition, the invention further provides "smart" tables which each incorporate various audio, visual, electronics, and electric power for interfacing with a user and their electronic devices. These features thereby advantageously provide useful enhancements and functionality beyond strict utilitarian function as a conventional table.

While the foregoing description and drawings represent the exemplary embodiments of the present invention, it will be understood that various additions, modifications and substitutions may be made therein without departing from the spirit and scope of the present invention as defined in the accompanying claims. In particular, it will be clear to those skilled in the art that the present invention may be embodied in other specific forms, structures, arrangements, proportions, sizes, and with other elements, materials, and components, without departing from the spirit or essential characteristics thereof. One skilled in the art will appreciate that the invention may be used with many modifications of structure, arrangement, proportions, sizes, materials, and components and otherwise, used in the practice of the invention, which are particularly adapted to specific environments and operative requirements without departing from the principles of the present invention. The presently disclosed embodiments are therefore to be considered in all respects as illustrative and not restrictive, the scope of the invention being defined by the appended claims, and not limited to the foregoing description or embodiments.

What is claimed is:

1. A multifunction table comprising:

a base comprising a front end, a rear end, and a primary cavity;

a first storage unit located within the primary cavity, the first storage unit defining a first storage area having a first opening at the front end of the base that is closed by a first closure member;

a second storage unit located within the primary cavity, the second storage unit defining a second storage area having a second opening at the front end of the base that is closed by a second closure member, the second storage area being adjacent to the first storage area;

the primary cavity comprising a rear portion located between the first and second storage units and the rear end of the base; and a compressor operably coupled to the first storage area of the first storage unit to cool the first storage area;

at least one speaker; and a control panel comprising:

refrigerator controls configured to control a temperature of the first storage area; and speaker controls configured to control characteristics of a sound emitted from the at least one speaker; and wherein the control panel is located on a top surface of the base, the control panel comprising a display that displays a temperature setting for the first storage area.

2. The multifunction table according to claim 1 wherein the characteristics comprise one or more of volume, balance treble, base, one/off, and source.

3. The multifunction table according to claim 1 further comprising:

the at least one speaker comprising a first speaker and a second speaker;

a first speaker compartment located within the rear portion of the primary cavity, the first speaker located within the first speaker compartment;

a second speaker compartment located within the rear portion of the primary cavity, the second speaker located within the second speaker compartment; and wherein the first speaker compartment is located adjacent to a first side of the base, the second speaker compartment is located adjacent to a second side of the base, and the compressor is located between the first and second speaker compartments.

4. The multifunction table according to claim 1 wherein the first storage area has a first volume and the second storage area has a second volume, the first volume being greater than the second volume.

5. The multifunction table according to claim 1 wherein the base comprises a first side and a second side opposite the first side, each of the first and second sides extending between the front and rear ends of the base, wherein the first closure member has a first width measured in a direction between the first and second sides of the base and wherein the second closure member has a second width measured in the direction between the first and second sides of the base, the first width being greater than the second width.

6. The multifunction table according to claim 1 wherein the compressor is not directly coupled to the second storage area of the second storage unit such that the second storage area is not directly cooled by the compressor.

7. The multifunction table according to claim 1 wherein the first storage unit comprises a first drawer that is slidable relative to the base into and out of the primary cavity and wherein the second storage unit comprises a second drawer that is slidable relative to the base into and out of the primary cavity.

8. The multifunction table according to claim 1 wherein the display is further configured to display the characteristics of the sound emitted from the pair of speakers, the characteristics being selected from at least volume, balance, treble, base, on/off, and source.

9. The multifunction table according to claim 1 further comprising a Bluetooth module configured for operable coupling with an electronic device.

10. The multifunction table according to claim 1 wherein the base comprises a first sidewall and a second sidewall, and further comprising a charging station located along one of the first and second sidewalls, the charging station comprising a plurality of USB ports.

11. The multifunction table according to claim 10 wherein the plurality of USB ports are located within a pocket in the one of the first and second sidewalls.

12. The multifunction table according to claim 1 further comprising a main power receptacle comprising one or more outlets.

13. The multifunction table according to claim 1 wherein the base has a rectangular parallelepiped configuration with rounded corners having a length, a height, and a width, the length being greater than the height and the width.

14. A multifunction table comprising:

a base comprising a front end, a rear end, a primary cavity, and a top surface for supporting objects;

a first storage unit located within the primary cavity, the first storage unit defining a first storage area having a first opening at the front end of the base that is closed by a first closure member;

a second storage unit located within the primary cavity, the second storage unit defining a second storage area having a second opening at the front end of the base that is closed by a second closure member, the second storage area being adjacent to the first storage area;

the primary cavity comprising a rear portion located between the first and second storage units and the rear end of the base; and a compressor operably coupled to the first storage area of the first storage unit to cool the first storage area;

at least one speaker;

a control panel comprising:

refrigerator controls configured to control a temperature of the first storage area; and speaker controls configured to control characteristics of a sound emitted from the at least one speaker; and a wireless charging pad located on the top surface of the base for charging electronic devices.

15. A multifunction table comprising:

a base comprising a primary cavity that is divided into a first storage portion having a first opening and a second storage portion having a second opening, wherein the base has a rectangular parallelepiped configuration comprising a top surface, a bottom surface, a left side surface, and a right side surface, wherein the base has rounded corners between the left side surface and the top and bottom surfaces and between the right side surface and the top and bottom surfaces, wherein the base has a length, a height, and a width, the length being greater than the height and the width, wherein the first and second storage portions of the primary cavity are side-by-side adjacent to one another, and wherein the first storage portion has a greater width than the second storage portion;

a first storage unit comprising the first storage portion;

a second storage unit comprising the second storage portion;

the primary cavity comprising a rear portion located between the first and second storage portions and a rear of the base; and a compressor located within the rear portion of the primary cavity and being operably coupled to the first storage portion to cool the first storage portion.

16. The multifunction table according to claim 15 further comprising at least one speaker located within the rear portion of the primary cavity.

17. The multifunction table according to claim 16 further comprising a control panel located along the top surface of the base, the control panel comprising:

refrigerator controls configured to control a temperature of the first storage portion;

speaker controls configured to control characteristics of a sound emitted from the at least one speaker; and a display that displays at least one of:

a temperature setting for the first storage portion; and a volume of the sound configured to be emitted from the at least one speaker.

18. The multifunction table according to claim 17 wherein the display is configured to display the temperature setting while the refrigerator controls are being used, and wherein the display is configured to display the volume of the sound configured to be emitted from the at least one speaker while the speaker controls are being used.

19. A multi-function table comprising:

a housing comprising a primary cavity and an open receptacle located above the primary cavity;

a refrigeration assembly located within the primary cavity of the housing, the refrigeration assembly having a refrigerated storage area that is accessible by a first closure member;

a non-refrigerated storage assembly located within the primary cavity of the housing, the non-refrigerated storage assembly having non-refrigerated storage area that is accessible by a second closure member; and a speaker insert comprising a pair of laterally spaced apart speakers and a storage compartment disposed between the speakers, the speaker insert being a singular structural component that is configured for insertion into the open receptacle of the housing, the storage compartment defining an empty cavity that is configured to store personal items, the storage compartment having a front opening configured to allow insertion of the personal items into and removal of the personal item from the storage compartment.

20. The multi-function table according to claim 19 further comprising:

the speaker insert comprising a top surface and a charging pad located on the top surface;

the housing comprising a top surface and an opening that extends from the top surface to the open receptacle; and wherein when the speaker insert it positioned in the open receptacle of the housing, the charging pad extends into the opening in the top surface of the housing.

* * * * *